(12) United States Patent
Zhang et al.

(10) Patent No.: US 7,825,954 B2
(45) Date of Patent: Nov. 2, 2010

(54) MULTI-STATE TARGET TRACKING

(75) Inventors: Zhong Zhang, Herndon, VA (US);
Haiying Liu, Chantilly, VA (US); Alan J. Lipton, Herndon, VA (US); Zeeshan Rasheed, Reston, VA (US); Paul C. Brewer, Arlington, VA (US); Andrew J. Chosak, Arlington, VA (US); Niels Haering, Reston, VA (US); Peter L. Venetianer, McLean, VA (US); Weihong Yin, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 1422 days.

(21) Appl. No.: 11/139,600

(22) Filed: May 31, 2005

(65) Prior Publication Data

US 2006/0268111 A1    Nov. 30, 2006

(51) Int. Cl.
*H04N 5/225*  (2006.01)
*G06K 9/00*   (2006.01)

(52) U.S. Cl. .................. 348/169; 382/103

(58) Field of Classification Search ............ 348/169, 348/143, 171; 382/103; 706/14, 16

See application file for complete search history.

(56) References Cited

U.S. PATENT DOCUMENTS

| 5,761,382 A * | 6/1998 | Shams ............... 706/14 |
| 6,404,455 B1 | 6/2002 | Ito et al. |
| 6,502,082 B1 * | 12/2002 | Toyama et al. ......... 706/16 |
| 6,999,600 B2 * | 2/2006 | Venetianer et al. ....... 382/103 |
| 2006/0215880 A1 * | 9/2006 | Berthilsson et al. ..... 382/103 |

* cited by examiner

*Primary Examiner*—Gims S Philippe
(74) *Attorney, Agent, or Firm*—Venable LLP; Michael A. Sartori; Yao Wang

(57) ABSTRACT

A method of video analysis may comprise tracking a state of each target in a video through multiple frames of said video, each state indicating a visibility condition of a target.

42 Claims, 34 Drawing Sheets

| Target States | Descriptions |
|---|---|
| Visible | Stable tracked with high confidence |
| Stationary | Completely stopped moving and may be considered as part of background |
| Occluded | Completed or partially occluded by other foreground targets |
| Disappeared | Can not be observed in the scene either because left the field of view or blocked by static background |
| Reappeared | Be observed again after disappearing or occlusion |
| Expired | The end of target tracking |

Figure 6

| Target Connections | Descriptions |
|---|---|
| ToId | The target id of the target the current target merged into or split off |
| FromId | The target id of the target the current target originated from or absorbed. |
| EqualToId | The target id of the target appears after the current target but corresponds to the same physical object with the current target |
| EqualFromId | The target id of the target appears before the current target but corresponds to the same physical object with the current target |

Figure 7

| Time | Target State | | | | | |
|---|---|---|---|---|---|---|
| | A | B | C | D | E | F |
| 1 | V | | | | | |
| 2 | V | V | | | | |
| 3 | V | V | | | | |
| 4 | V | V | | | | |
| 5 | V | V | | | | |
| 6 | V | V | | | | |
| 7 | S | V | | | | |
| 8 | S | V | | | | |
| 9 | S | V | | | | |
| 10 | S | D | | | | |
| 11 | S | D | | | | |
| 12 | S | D | V | | | |
| 13 | S | D | V | | | |

| Time | Target State | | | | | |
|---|---|---|---|---|---|---|
| | A | B | C | D | E | F |
| 14 | V | R | V | | | |
| 15 | V | | V | | | |
| 16 | V | | V | | | |
| 17 | O | | O | V | | |
| 18 | O | | O | V | | |
| 19 | O | | O | V | | |
| 20 | R | | R | O | V | |
| 21 | | | | O | V | V |
| 22 | | | | O | V | V |
| 23 | | | | O | V | V |
| 24 | | | | O | V | V |
| 25 | | | | O | V | V |
| 26 | | | | O | D | D |
| 27 | | | | E | E | E |

Figure 9

| Time | Target connections ||||||
|---|---|---|---|---|---|---|
| | A | B | C | D | E | F |
| 14 | | EqualToId: C | EqualFromId: B | | | |
| 17 | ToId: D | | ToId: D | FromId: A,C | | |
| 20 | EqualToId: F | | EqualToId: E | To: E, F | FromId: D EqualFromId: C | FromId: D EqualFromId: A |

Figure 10

| Target tracks | Target list |
|---|---|
| 1 | A → D → F |
| 2 | B → C → D → E |

| "occluded" targets | "visible" targets | | |
|---|---|---|---|
| | A | B | C |
| 1 | 0.8 | 0.2 | 0.4 |
| 2 | 0.9 | 0.8 | 0.1 |
| 3 | 0.3 | 0.3 | 0.2 |
| 4 | 0.2 | 0.1 | 0.8 |

1804

| "occluded" targets | "visible" targets | | |
|---|---|---|---|
| | A | B | C |
| 1 | 0.15 | -0.6 | -0.4 |
| 2 | 0.1 | 0.2 | -0.75 |
| 3 | -0.3 | -0.35 | -0.35 |
| 4 | -0.65 | -0.7 | 0.5 |

1806 — Best satisfaction score

| "occluded" targets | "visible" targets | | |
|---|---|---|---|
| | A | B | C |
| 1 | 0.95 | -0.4 | 0 |
| 2 | 1.0 | 1.0 | -0.65 |
| 3 | 0 | -0.15 | -0.15 |
| 4 | -0.45 | -0.6 | 1.3 |

Figure 18

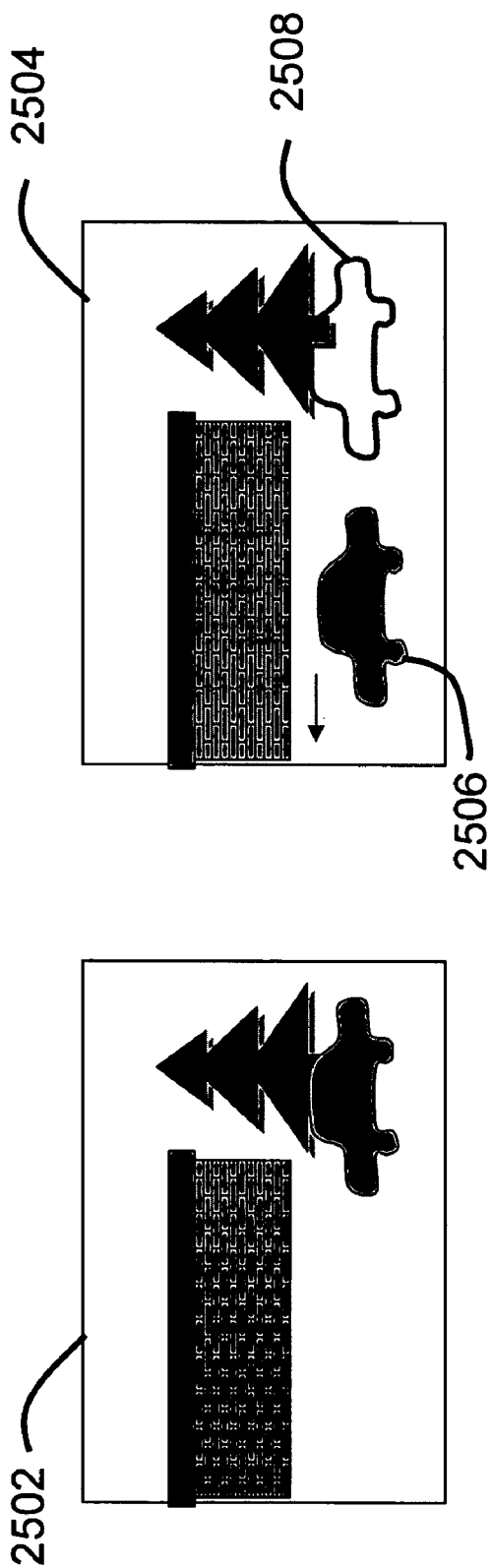
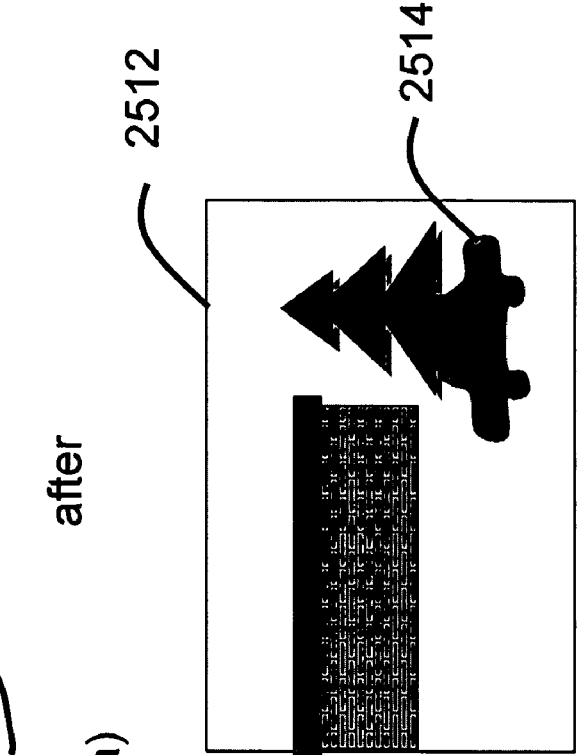
Figure 25(a)
Figure 25(b)

Before $t_0$

Target1
$t_1 = t_0 + dt$

Target1
$t_2 = t_1 + dt$

Target3
Target2
$t_3 = t_2 + dt$

MULTI-STATE TARGET TRACKING

BACKGROUND OF THE INVENTION

1. Field of the Invention

Embodiments of the present invention may relate to surveillance systems. Specifically, various embodiments of the invention may relate to a video-based intelligent surveillance system that can automatically provide real-time situation awareness regarding the scene under monitoring.

2. Related Art

Some state of art intelligent video surveillance (IVS) systems can perform content analysis on the frames taken by surveillance cameras. Based on user-defined rules or policies, such IVS systems can automatically detect potential threats by detecting, tracking and analyzing the targets in the scene. The performance of such IVS systems is thus highly correlated with the performance of target tracking. There are many factors that may impact the performance of target tracking, among which the most commonly seen ones are target occlusions and stationary target tracking.

When the target is moving by itself and the whole body of the target can be seen, the tracking process is usually simple and straightforward. But when the target is occluded or partially occluded by other targets or by static background objects, or when the target is occluding other targets, the tracker may become confused, which may cause lost tracking or target false tracking. A conventional method to handle occlusion is to use prediction, where the location of an occluded target is provided by predicting its location based on previous non-occluded locations. This method, however, usually works only when the occlusion duration is short and the target has consistent velocity before and during occlusion.

Another problematic scenario for a conventional target tracker is the tracking of non-moving targets, denoted "stationary targets." A stationary target refers to a target that is different from a current background scene, but which is not moving. A stationary target may correspond to one of two types of targets: one is a stopped moving target, and the other is the ghost of a target after the target has moved away from the original background. Conventional target trackers usually handle such stationary targets by burning them into background and by forgetting them after tracking them for some significant time duration. This scheme, however, assumes that the stationary target detected will not move again, which is not true in many real applications. In addition, since the tracker may lose the target once it has been burned into background, this scheme usually requires a significant consistently stationary time period prior to burning into background, during which the target may cause some occlusions with other moving targets, which may further complicate the scenario.

SUMMARY OF THE INVENTION

Embodiments of the present invention involve a multi-state target tracker that may reliably handle the above issues. According to such embodiments, a target under tracking may be considered to be always in one of several typical states. The transition from one state to another may be handled by a specific tracking module. This technology is not only limited to IVS applications but also can be used in other situations using video target tracking.

A method according to some embodiments of the invention may comprise tracking a state of each target in a video through multiple frames of said video, each state indicating a visibility condition of a target.

The invention includes a method, a system, an apparatus, and an article of manufacture for video target tracking.

The invention includes a machine-accessible medium containing software code that, when read by a computer, causes the computer to perform a method for video target tracking comprising the steps of: performing change detection on the input surveillance video; detecting and tracking targets; and detecting events of interest based on user defined rules.

A system for the invention includes a computer system including a computer-readable medium having software to operate a computer in accordance with the invention.

An apparatus for the invention includes a computer including a computer-readable medium having software to operate the computer in accordance with the invention.

An article of manufacture for the invention includes a computer-readable medium having software to operate a computer in accordance with the invention.

The invention may be embodied in the form(s) of hardware, software, firmware, and/or combinations thereof. Furthermore, such hardware may take the form of programmable and/or application-specific hardware, for example, one or more microprocessors, special-purpose processors, application-specific integrated circuits (ASICs), field-programmable gate arrays (FPGAs), etc.

Exemplary features and advantages of the invention, as well as the structure and operation of various embodiments of the invention, may be described in detail below with reference to the accompanying drawings.

BRIEF DESCRIPTION OF THE DRAWINGS

The foregoing and other features and advantages of the invention will be apparent from the following, more particular description of exemplary embodiments of the invention, as illustrated in the accompanying drawings, wherein like reference numbers generally indicate identical, functionally similar, and/or structurally similar elements.

FIG. 6 lists possible target states according to embodiments of the invention;

FIG. 7 lists possible target connections according to embodiments of the invention;

FIG. 9 lists target states for targets tracked in the exemplary scenario illustrated in FIG. 8, according to embodiments of the invention;

FIG. 10 lists target connections for the exemplary scenario illustrated in FIG. 8, according to embodiments of the invention;

FIG. 11 lists target tracks corresponding to the real object in the exemplary scenario illustrated in FIG. 8, according to embodiments of the invention;

FIG. 18 shows an example of how to compute a global matching probability between two targets using a best satisfaction metric according to embodiments of the invention;

FIGS. 25(a) and 25(b) show a pair of simulated scenarios of "ghost" (removal) stationary target and non-"ghost" (insertion) stationary target according to some embodiments of the invention;

DEFINITIONS

Figure 1:
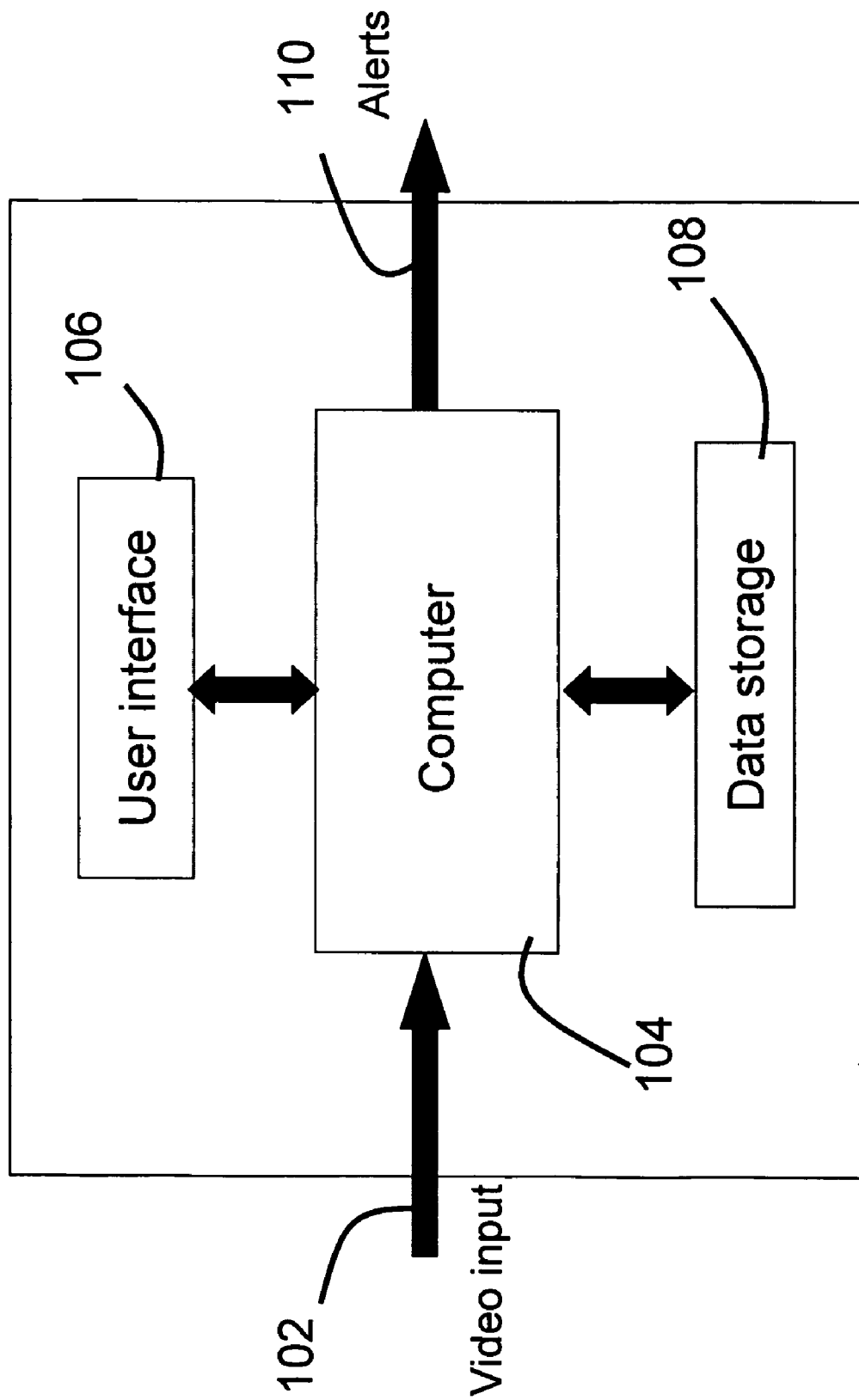
FIG. 1 depicts a conceptual block diagram of a typical IVS system according to embodiments of the invention.

The following definitions are applicable throughout this disclosure, including in the above.

A "video" refers to motion pictures represented in analog and/or digital form. Examples of video include: television, movies, image sequences from a video camera or other observer, and computer-generated image sequences.

A "frame" refers to a particular image or other discrete unit within a video.

An "object" refers to an item of interest in a video. Examples of an object include: a person, a vehicle, an animal, and a physical subject.

A "target" refers to the computer's model of an object. The target is derived from the image processing, and there is a one-to-one correspondence between targets and objects. The target in this disclosure particularly refers to a period of a consistent computer model for an object for a certain time duration.

A "target track" refers to a list of related targets which all correspond to a same object but on different timestamps.

A "computer" refers to any apparatus that is capable of accepting a structured input, processing the structured input according to prescribed rules, and producing results of the processing as output. The computer can include, for example, any apparatus that accepts data, processes the data in accordance with one or more stored software programs, generates results, and typically includes input, output, storage, arithmetic, logic, and control units. Examples of a computer include: a computer; a general purpose computer; a supercomputer; a mainframe; a super mini-computer; a mini-computer; a workstation; a micro-computer; a server; an interactive television; a web appliance; a telecommunications device with internet access; a hybrid combination of a computer and an interactive television; a portable computer; a personal digital assistant (PDA); a portable telephone; and application-specific hardware to emulate a computer and/or software. A computer can be stationary or portable. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; and a magnetic tape.

"Software" refers to prescribed rules to operate a computer. Examples of software include: software; code segments; instructions; software programs; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone, wireless, or other communication links. Examples of a network include: an internet, such as the Internet; an intranet; a local area network (LAN); a wide area network (WAN); and a combination of networks, such as an internet and an intranet.

An "information storage device" refers to an article of manufacture used to store information. An information storage device has different forms, for example, paper form and electronic form. In paper form, the information storage device includes paper printed with the information. In electronic form, the information storage device includes a computer-readable medium storing the information as software, for example, as data.

DETAILED DESCRIPTION OF EXEMPLARY EMBODIMENTS OF THE INVENTION

Exemplary embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

FIG. 1 depicts a conceptual block diagram of a typical IVS system 100 according to embodiments of the invention. The input 102 may be a normal CCTV video signal or other video source. Content analysis module 104, which may, in some embodiments of the invention, be embodied as a computer, may perform scene content analysis. A user may set up the system and define events of interest through the user interface 106. Once any such event is detected, alerts 110 may be sent out, which may be sent to specific people, and which may contain necessary information and/or instructions for further attention and investigation. The video data, scene context data, and/or other event related data may be stored in data storage 108 for later forensic analysis.

Figure 2:
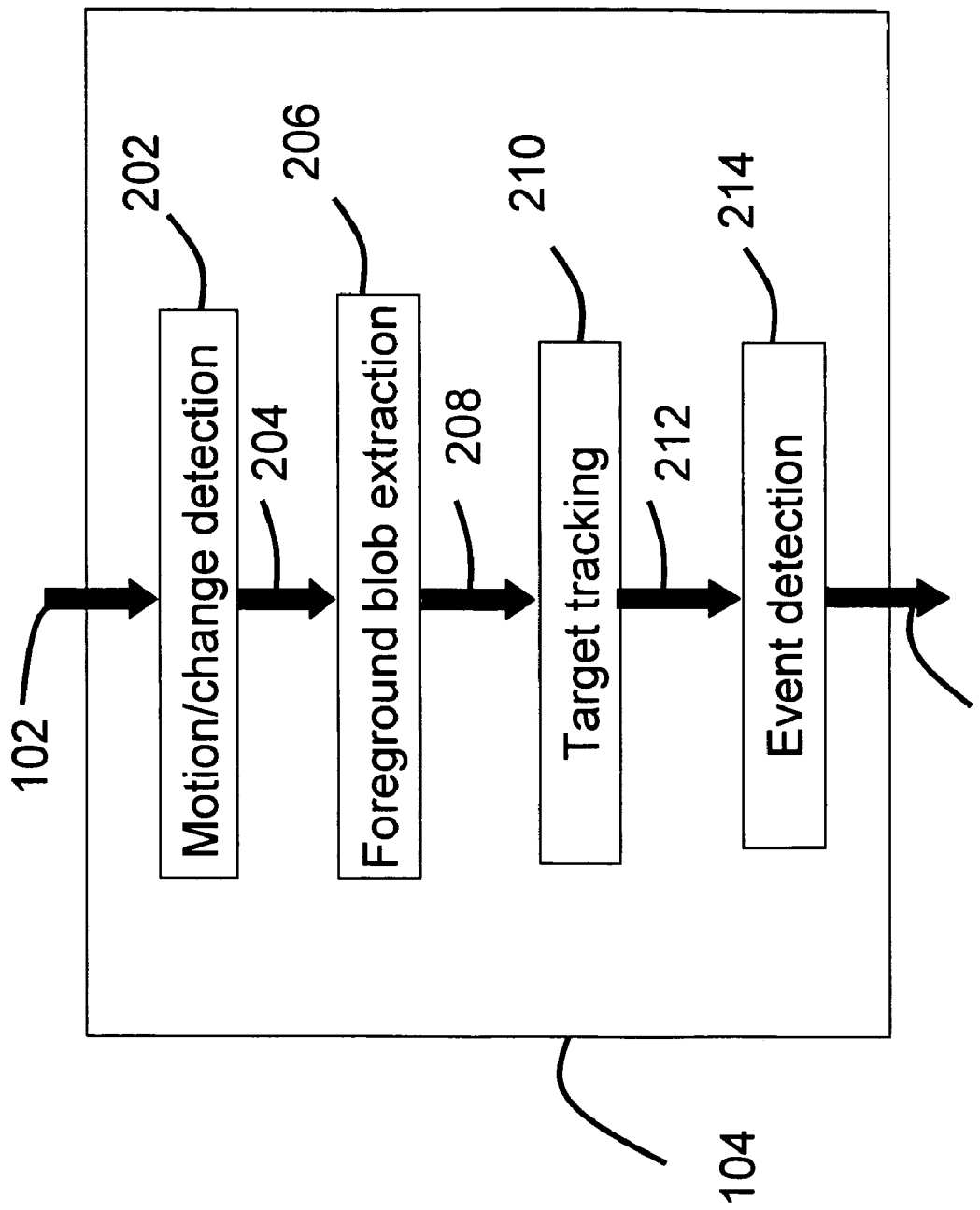
FIG. 2 depicts a conceptual block diagram of a content analysis module of an IVS system according to embodiments of the invention.

FIG. 2 depicts a conceptual block diagram of a content analysis module 104, according to embodiments of the invention. First, the system may use motion and change detection 202 to separate foreground from background, and the output of this module 204 may include a foreground mask for each frame. Next, the foreground regions may be divided into separate blobs 208 by the blob extraction module 206; these blobs 208 may correspond to observations of target at each timestamp (where, for example, a particular timestamp may be associated with one or more frames of the video). Target tracking module 210 may create and track each target in the video, where such a target may correspond to an object in the scene. Tracking module 210 enables one to obtain a representation of a real object 212. Finally, event detection module 214 performs event detection based on user-defined rules.

In particular embodiments of the invention, target tracking module 210 may use a multi-state target representation and an associated target tracking scheme. In some embodiments of the invention, motion/change detection module 202 may update a background model based on a whole target, rather than on each pixel. In some embodiments of the invention, foreground blob extraction module 206 may use an active method to extract blobs from the foreground masks in which target tracking information may be used. In some embodiments of the invention, event detection module 214 may include various capabilities that may be enabled by the capabilities of target tracking module 210. Various embodiments of each of these modules will now be addressed in detail.

Figure 3:
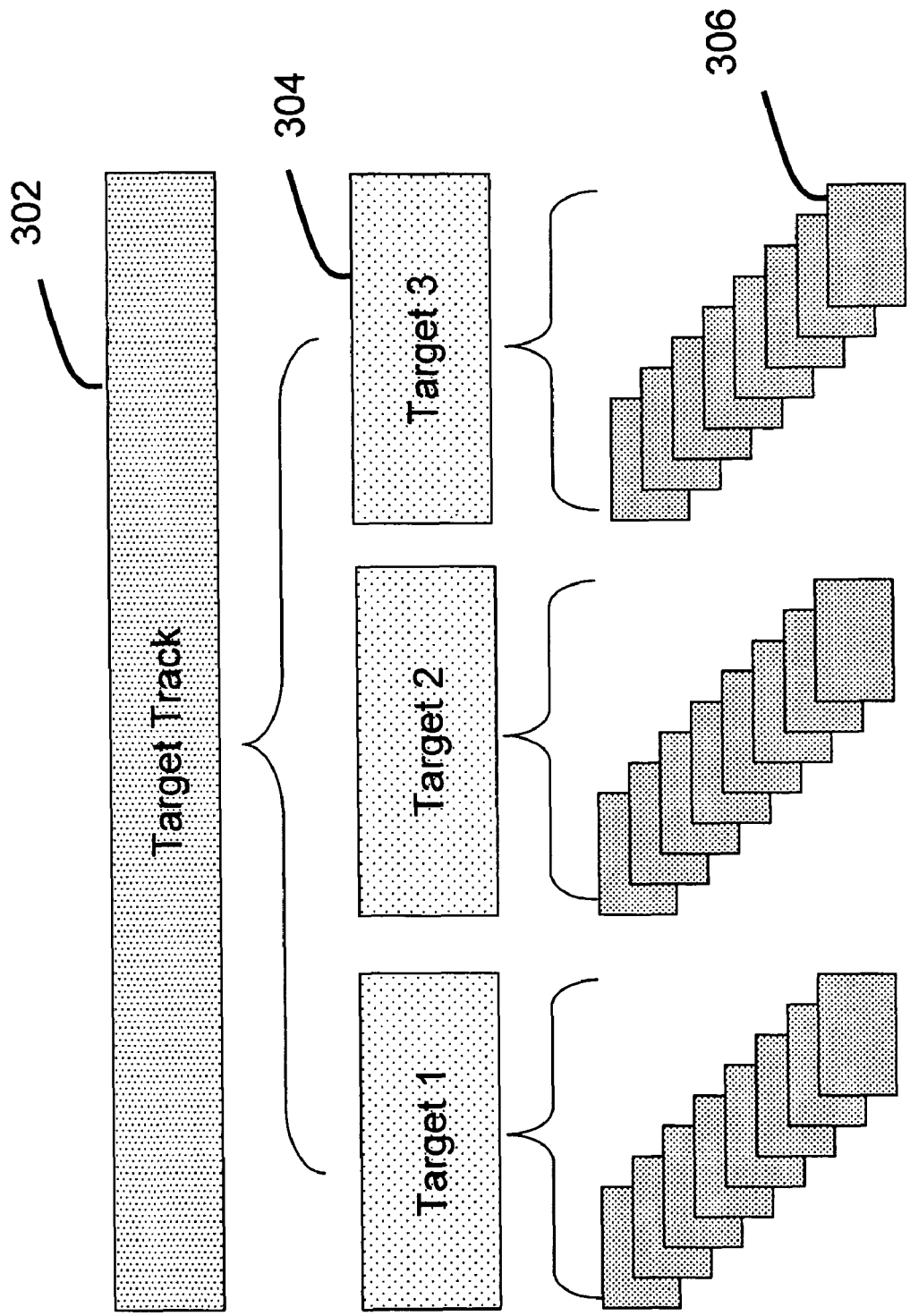
FIG. 3 illustrates a multiple level object representation according to embodiments of the invention.

FIG. 3 illustrates a multiple level object representation according to some embodiments of the invention. Target track 302 may represent a target track, which may consist of a list of targets 304. Here, the target track 302 may, for example, be a complete representation of a real object. Each target 304 may correspond to an object in a particular time segment. Note that a particular real object may appear and disappear in a given video scene over time at various times due to occlusions and/or moving in and out of the scene. At different appearance times, a particular object may correspond to targets 304 with different target IDs, but the object may correspond to a single target track 302. A target 304 may consist of a sequence of target slices 306, which provide the image representations of the target at each of consecutive timestamps.

Figure 4:
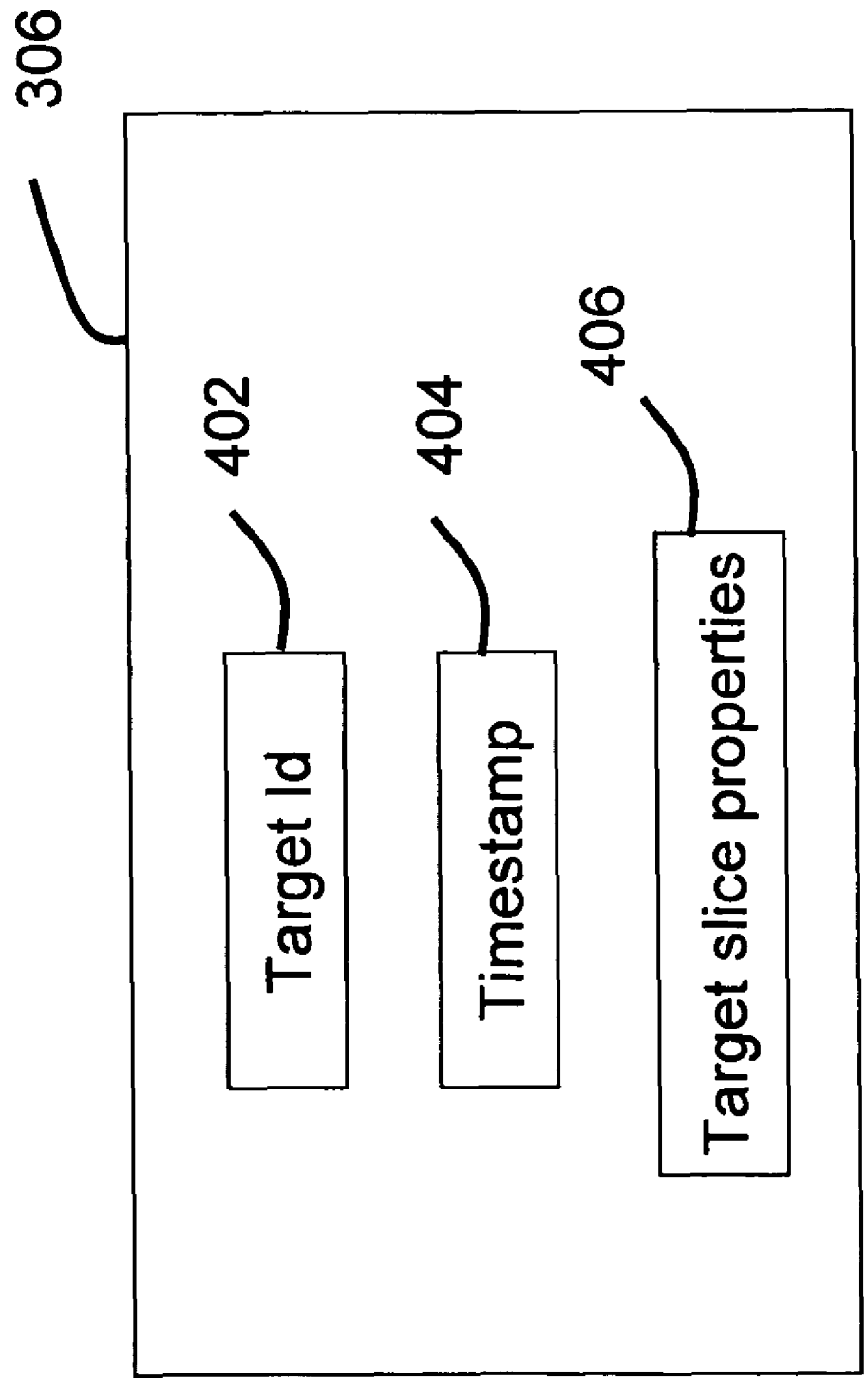
FIG. 4 lists major data components in a target slice according to embodiments of the invention.

FIG. 4 lists major data components of a target slice 306 according to embodiments of the invention. A target slice may contain a target ID 402, which may be a unique number for each target created by the target tracker 210, and which may be used as key to link all the corresponding target slices 306. A target slice 306 may also contain a timestamp 404 that may provide timing information of the current target representation. Various image representations 406 of the target 304 may be also stored in the target slice 306, which may include, but which are not limited to, such general properties as image size, bounding box, velocity, footprint location, centroid location, histogram, color and shape, etc. Some special features, such as detected human face, human head, and/or line features, may be also included.

Figure 5:
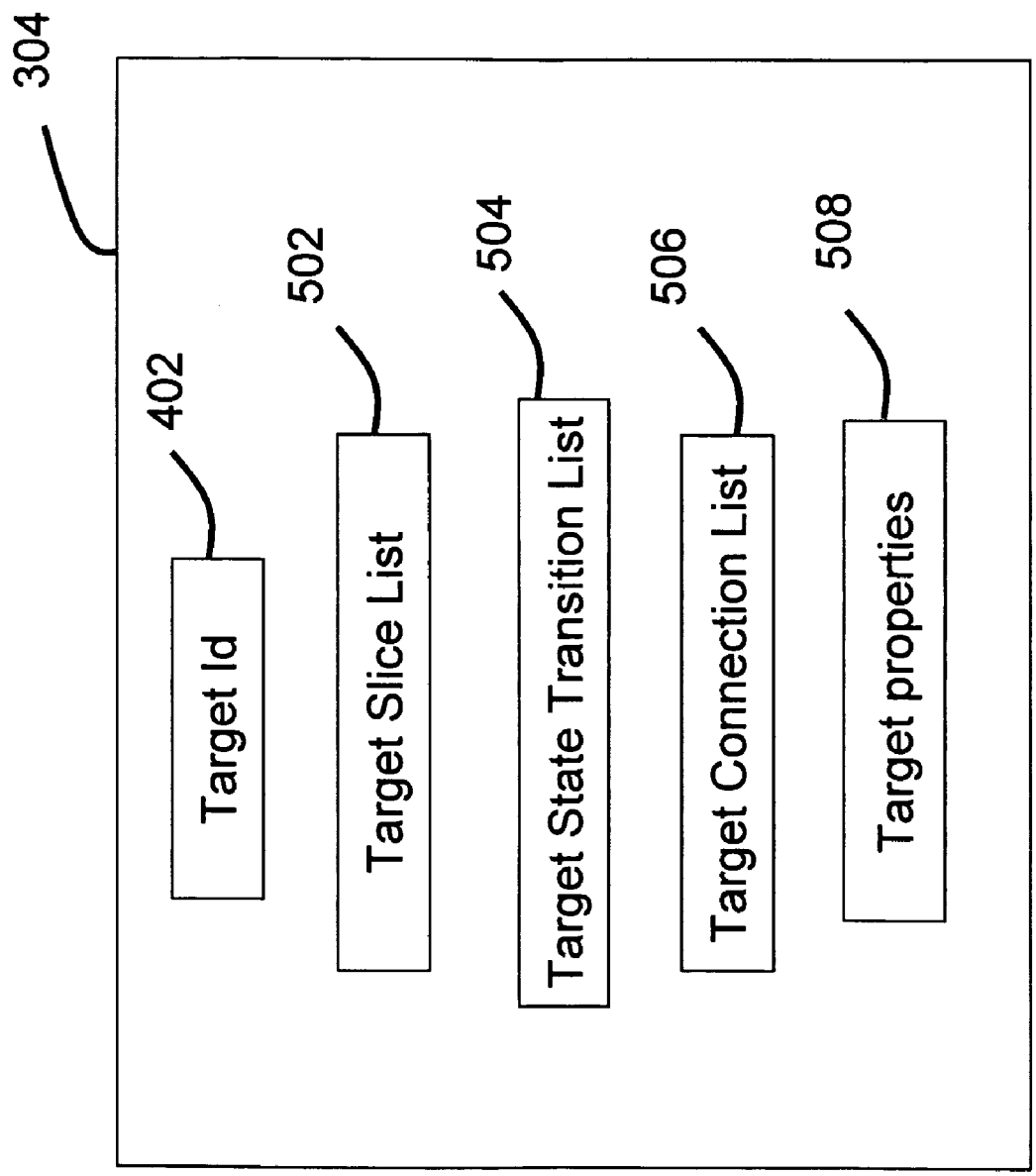
FIG. 5 lists major data components in a target according to embodiments of the invention.

FIG. 5 lists major data components in a target 304 according to some embodiments of the invention. Each target 304 may have its own unique ID 402 assigned at its creation time. A target 304 may also have a list of target slices 502 indexed by the timestamp of each video frame. Target state information may be stored in a target state transition list 504, which may be time-indexed.

FIG. 6 shows a list of possible target states according to various embodiments of the invention. The "visible" state may correspond to a stably tracked target that is consistently moving and fully observed in the video frames. A "visible" target may have a target slice for every timestamp, which means that it has image representation in every frame (hence the name "visible"). The "stationary" state may indicate a non-moving target, where a target slice is not necessary for every frame because the state itself indicates that the target location and appearance may be unchanged from frame to frame. An "occluded" state means that, although the target is still in the view, it is either occluded by other targets or occluding other targets. Thus, its accurate location and appearance may not be available. An "occluded" target may not have corresponding target slices, but it may have connected "visible" targets into which it may merge or split. A "disappeared" state indicates that the target has disappeared from the video frame. A target may go into "disappeared" state when it is completely occluded by a static background object or when it moves out of the video scene. "Occluded" targets or "disappeared" targets may become "reappeared" when they come out of occlusion or subsequently return to the video scene. When such a target is verified as the same object as an existing "visible" target in the frame, the target state may be changed to "reappeared," and the target may be assigned an equal ID to indicate the corresponding "visible" target. When a target has been "disappeared" for a long time, for example, more than a predetermined amount of time, which may be a user-defined parameter, the state may be changed to "expired," which means that this is the end of the target tracking process on this object and that this target may never be updated again or be connected to later targets.

Returning to FIG. 5, the target 304 may also contain a list of target connections 506, which may also be time-indexed.

When a target 304 undergoes a state transition, it may also involve connections with one or more other targets.

FIG. 7 lists possible target connections according to some embodiments of the invention. When a target X transitions from "visible" into "occluded" state, it may merge with another target Y and may create a new "visible" target Z. In this case, target X and Y may have a "ToId" Z, while target Z may have "FromId"s X and Y. That is, the targets that merge may have a "ToId" corresponding to a target into which they merge, while the target into which they merge may have "FromId"s corresponding to each of the targets that merged. Similarly, when a recently "visible" target N is verified to refer to the same object as that of an "occluded" target M, M may transition from "occluded" to "reappeared" and may have a "EqualToId" N, and N may have a "EqualFromId" M at the same time. Note that one target may have multiple "ToId" s or "FromId"s, but it may only have one "EqualFromId" and "EqualToId". A whole target track may comprise a concatenation of these "equal" targets, which may not have any overlap in temporal domain. As already noted above, a real-life object may be completely represented by a target track, even though it may be occluded or disappeared for one or more short time periods. To understand the target and target track concepts better, FIGS. 8 through 11 illustrate an exemplary target tracking scenario according to some embodiments of the invention.

To complete the discussion of FIG. 5, target 304 may further include one or more target properties 508.

Figure 8:
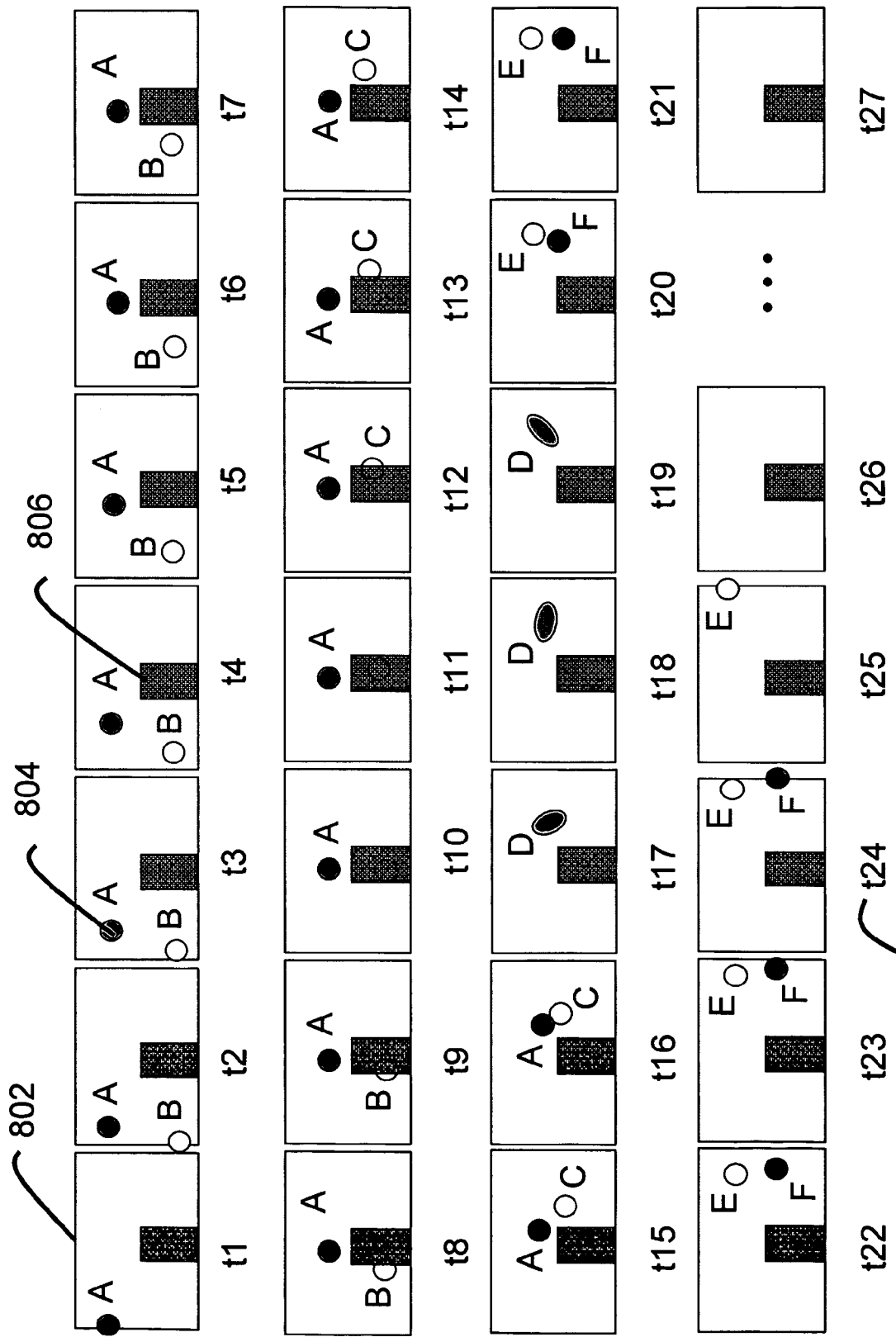
FIG. 8 shows a sequence of simulated video frames according to some embodiments of the invention.
Figure 11:
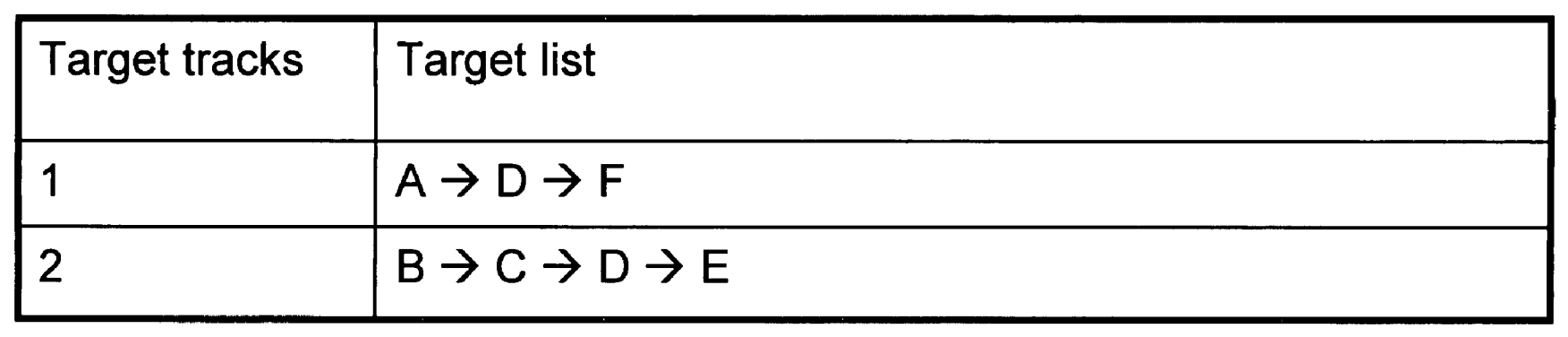

FIG. 8 shows a sequence of simulated video frames according to some embodiments of the invention. Block 802 indicates a video frame. Block 804 indicates one of the targets in the scene. Block 806 indicates a static background object in the scene that might occlude one or more of the foreground targets. Block 808 indicates one of the timestamps. In this example, two objects appear from the left of the scene, move across the frame and disappeared on the right boundary of the video frame. The first object enters the scene at t1, stops moving at t6, starts moving again at t14, merges with the second object at t17, comes out of the merge at t20, and moves out of the view at t26. The second object appears at t2, is completely blocked by background object 806 at t10, reappears at t12, merges with the first object at t17, comes out of the merge at t20, and disappears at t25. Due to the static background occlusion and the target occlusion, there may be six "visible" targets observed during these time periods, which may eventually form two target tracks corresponding to the two objects, respectively. FIGS. 9 through 11 show exemplary details of the target states, target connections, and the two target tracks.

FIG. 9 lists target states for the targets tracked in the exemplary scenario illustrated in FIG. 8, according to embodiments of the invention. Note that every target may start from "visible" state and may finish with "expired" state. The "reappeared" state and the "expired" state may be thought of as two special exiting cases where no further state transition need be considered. There might be some latency when changing from the "visible" state to the "stationary" state and when changing from the "disappeared" state into the "reappeared" state. This latency may be useful in order to build confidence as to whether or not a target stopped moving. When a new "visible" target appears in the scene, it may be partially occluded like target C at t12 (in FIG. 8), which may disable it from being verified as a previous disappeared target. A new "visible" target may only be used to compare with a previously "disappeared" target when the "visible" target is stably tracked and completely seen.

FIG. 10 lists target connections for the exemplary scenario illustrated in FIG. 8, according to embodiments of the invention. Note that connection information may come in pairs, which is redundant, but which may be used to increase the target searching and connecting speed.

FIG. 11 lists target tracks corresponding to the real objects in the exemplary scenario illustrated in FIG. 8, according to embodiments of the invention. By using the target connection information, the system may link related targets into a complete target track, which may correspond to a real object.

Figure 12:
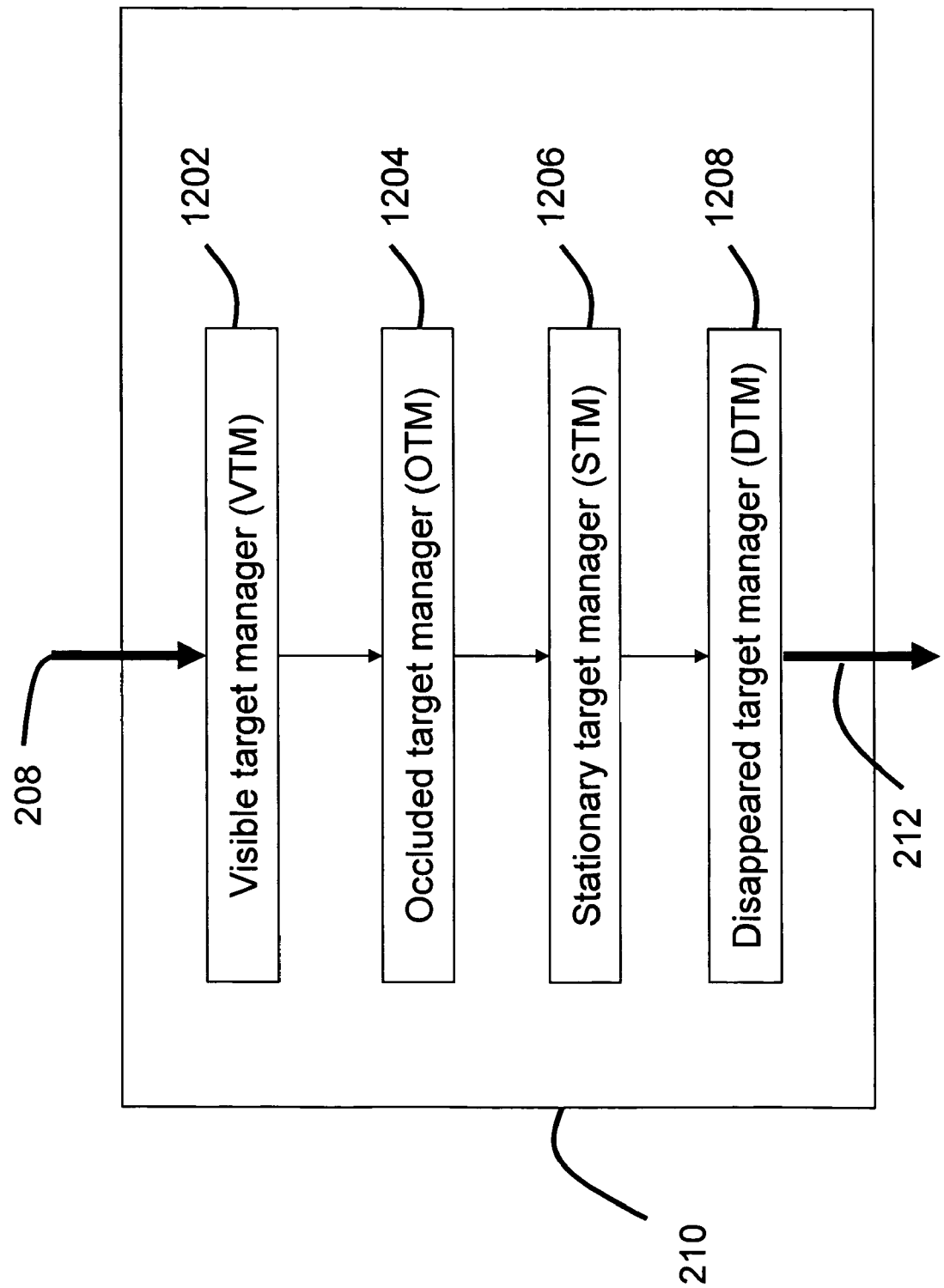
FIG. 12 depicts a block diagram of a target tracking module according to some embodiments of the invention.

FIG. 12 depicts a block diagram of a target tracking module 210 according to some embodiments of the invention. As described above, a target may take on six states, in which "reappeared" and "expired" are types of exit states that may indicate the end of the tracking process on the target. The other four states may correspond to four typical target tracking scenarios. A typical scenario of a "visible" target may be where a single target moves in a clear scene. The inventive system may use a visible target manager (VTM) 1202 to handle this scenario.

There may be multiple targets in a given scene, and the targets may block each other, which may cause occlusions, or a target may be partially blocked by some static background object, such as the trunk of a tree. These scenarios may be observed as target splits and merges during the tracking process, which implies incomplete target appearance representation and unconfident target location estimation. When this happens, the targets may be considered to be switching into the "occluded" state and may be further handled by an occluded target manager (OTM) 1204.

The third scenario may include the case when a moving target stopped moving and the case when a background object moves away and leaves a ghost target in the scene. In the first case, on one hand, the target may need to be built into the background to avoid interruptions with other pass-though targets and generating duplicate tracking data; on the other hand, a stopped target may need to be continuously monitored to see if it starts to move again. In the second case, the system may need to determine if a non-moving target is a ghost target or not and may need to update the background right away. Both cases may handled by stationary target manager (STM) 1206.

The last scenario is when the target completely disappears from the image, which may happen, for example, because of background object occlusion or because the target moved out of the video scene. This scenario differs from the "occluded" scenario in that the target is completely invisible in this scenario, while in the "occluded" scenario, the target is still partially visible, but the accurate location and appearance may be unavailable. The inventive system may use a disappeared target manager (DTM) 1208 to monitor such "disappeared" targets and to continue to check whether these targets come back to the scene again.

Figure 13:
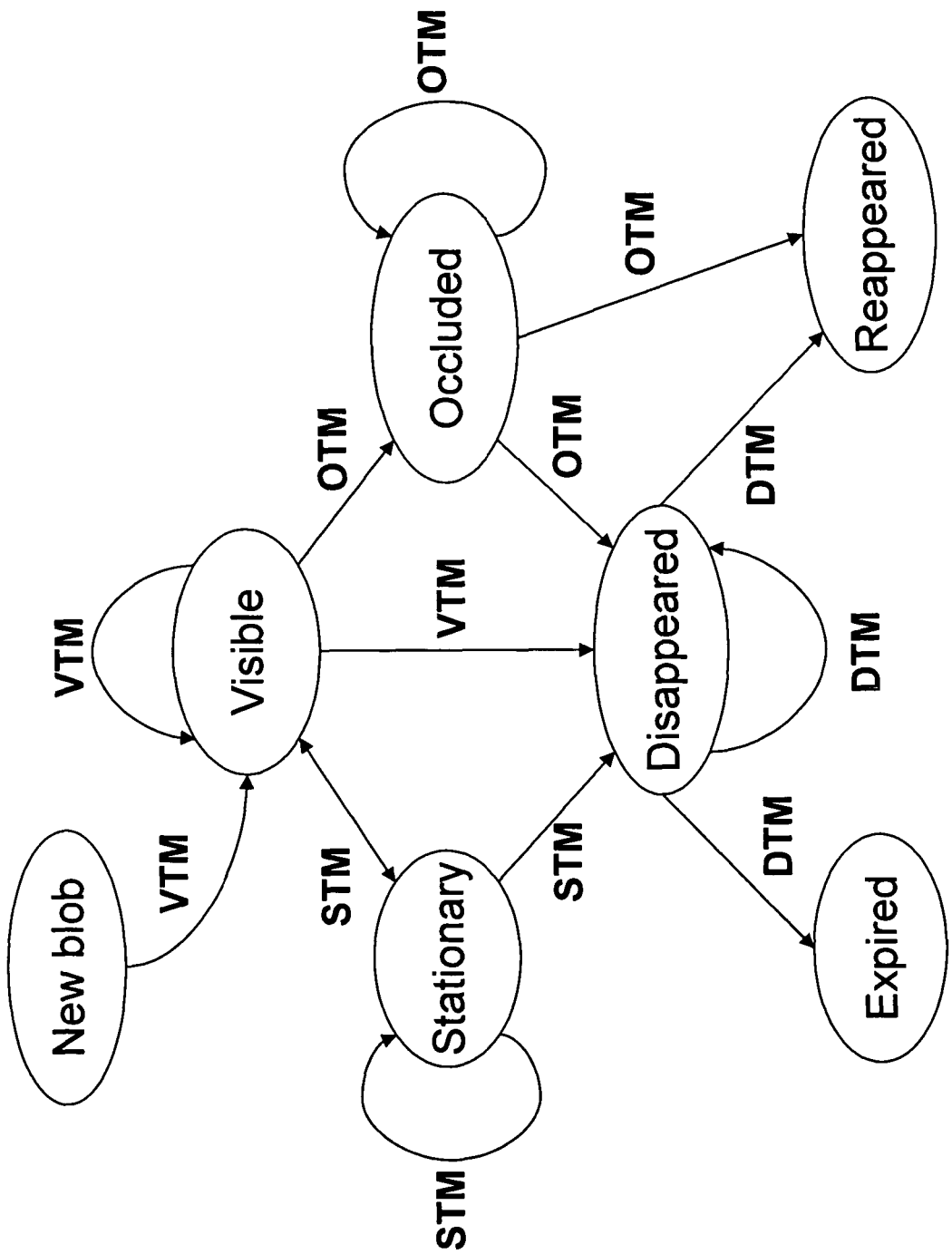
FIG. 13 illustrates possible transitions from state to state and corresponding tracking modules to control these transitions, according to embodiments of the invention.

FIG. 13 illustrates possible target transitions from state to state and the corresponding tracking modules to control these transitions, according to embodiments of the invention. New targets may be created by the VTM from the unmatched input blobs. The VTM may determine state transitions within the "visible" state and from the "visible" state to the "disappeared" state. The STM may detect "stationary" targets from "visible" targets and may monitor each "stationary" target until it disappears or moves again. The OTM may switch "visible" targets into "occluded" targets when such targets split or when merges happens and may determine whether an "occluded" target would reappear from occlusion or would disappear from the scene. The DTM may determine whether a temporarily "disappeared" target would come back to the scene again or would be permanently "expired" from the tracking system.

Figure 14:
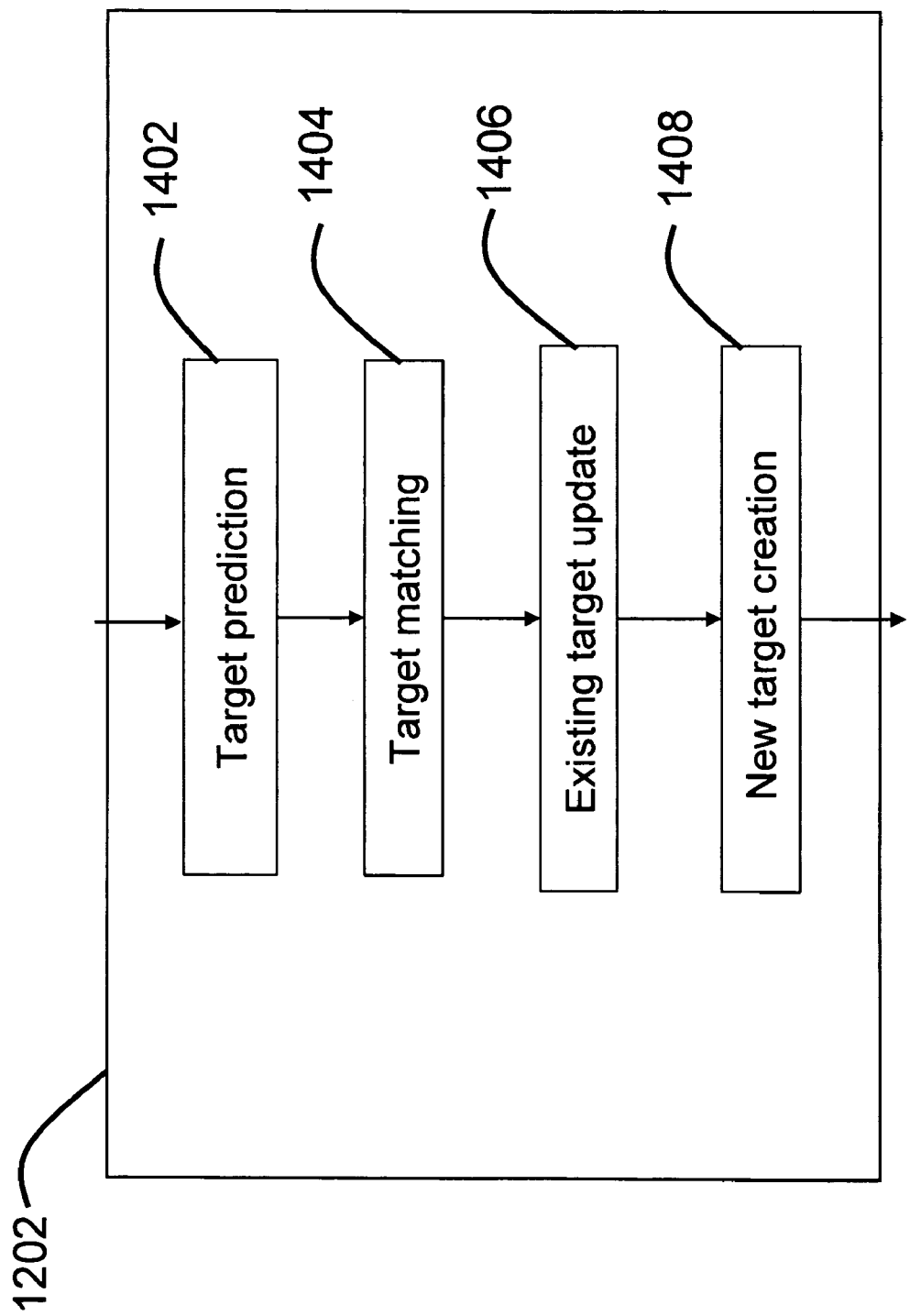
FIG. 14 depicts a conceptual block diagram of a visible target manager (VTM) module according to embodiments of the invention.

FIG. 14 depicts a conceptual block diagram of a VTM module 1202 according to some embodiments of the invention. Once a new "visible" target is created from an input foreground blob, it may be tracked while it is still in the video scene. At each new timestamp, the system may have a list of "visible" targets and a list of input newly-detected target blobs. A target matching module 1404 may be used to match all the existing targets to the newly-observed blobs based on their predicted locations, which may be provided by target prediction 1402. If an existing target can be matched with one and only one input blob, it may be updated 1406 using this newly observed blob, and a target slice may be generated based on the blob and the derived tracking information.

Two criteria may be used by target matching 1404 to determine whether a target and a blob have a good match. One is location overlap, which may be measured by an overlap ratio between the predicted target bounding box and the observed blob. The other is the appearance match between the target and the blob. The appearance measures may include such image properties as area, shape and color, etc.

The target update process 1406 may also estimate the target tracking stability status based on the target-to-blob matching and on the target history. At least three stability status types may be considered for every "visible" target: "appearing", "stable" and "disappearing". The "appearing" and "disappearing" status are indicated by quick increasing or decreasing of the target size, especially at the boundary of the image frame. The "stable" status reflects a consistent target image appearance.

If an existing "visible" target does not have any one-to-one matching blob, its state may be changed to "disappeared," and it may be handed over to the DTM. If a newly-detected blob does not have a matching existing "visible" target, a new target may be created 1408 from this observed blob. The output of one process of the DTM is the updated "visible" targets and any new "visible" and "disappeared" targets.

Figure 15:
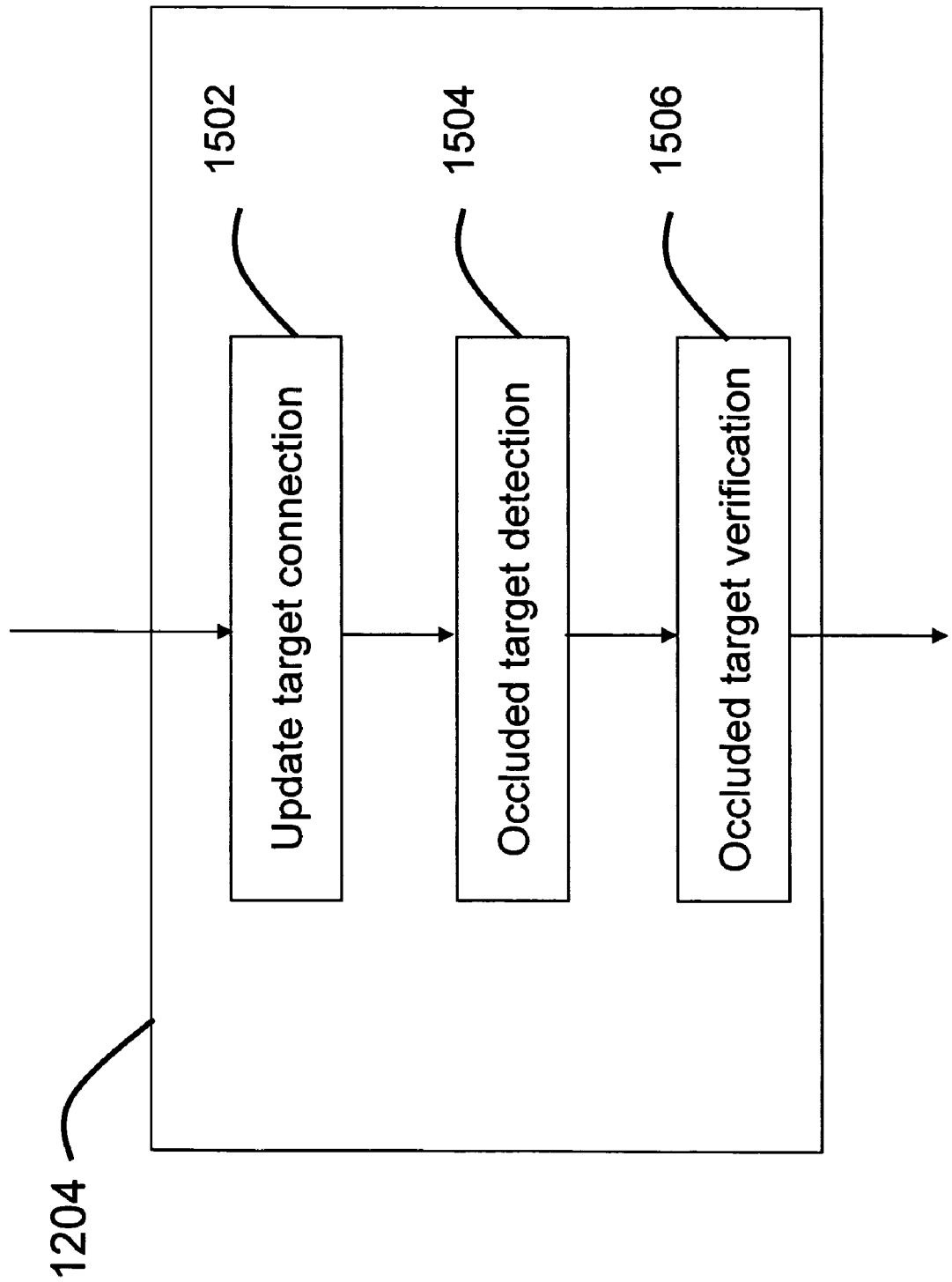
FIG. 15 depicts a conceptual block diagram of an occluded target manager (OTM) module according to embodiments of the invention.
Figure 16B:
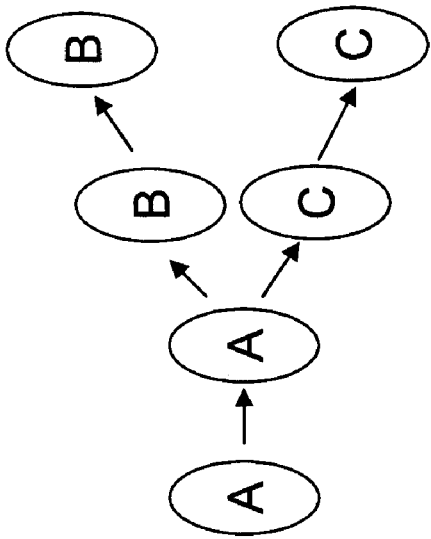
FIGS. 16(a)-16(d) illustrate some typical target connection scenarios corresponding to target splits and merges according to embodiments of the invention.
Figure 16D:
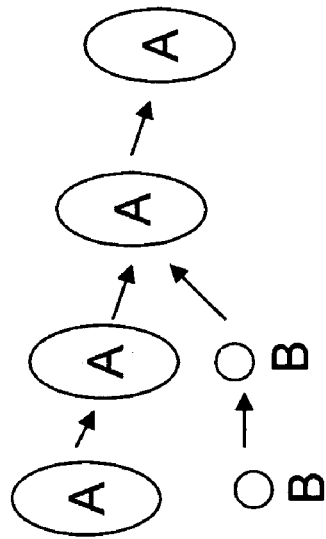
Figure 16A:
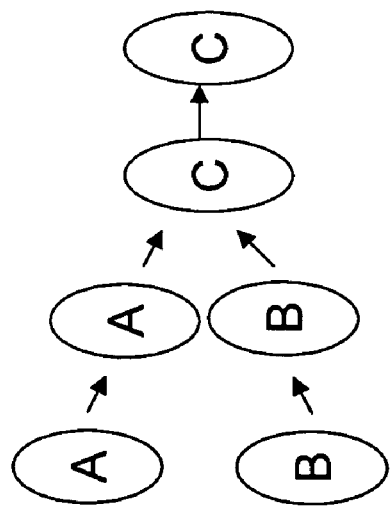
Figure 16C:
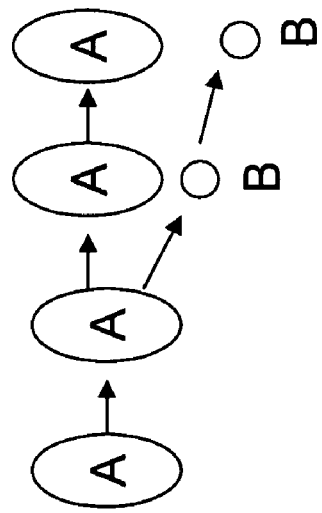

FIG. 15 depicts a conceptual block diagram of an OTM module 1204 according to embodiments of the invention. First, the OTM module 1204 may update target connections 1502, which may be done by associating any related new "visible" and "disappeared" targets. The target connections updated here may be introduced by target splits and merges, these target connections may be represented by the "ToId"s and "FromId"s. FIGS. 16(a)-16(d) illustrates some typical target connection scenarios that may correspond to target splits and merges.

Second, occluded target detection module 1504 may examine the new connections. A target may become "occluded" when it connects to new "visible" targets by "ToId"s and itself becomes "disappeared". For example, in FIG. 16(a), target A and B become "occluded" after they merge and create a new "visible" target C.

Figure 17:
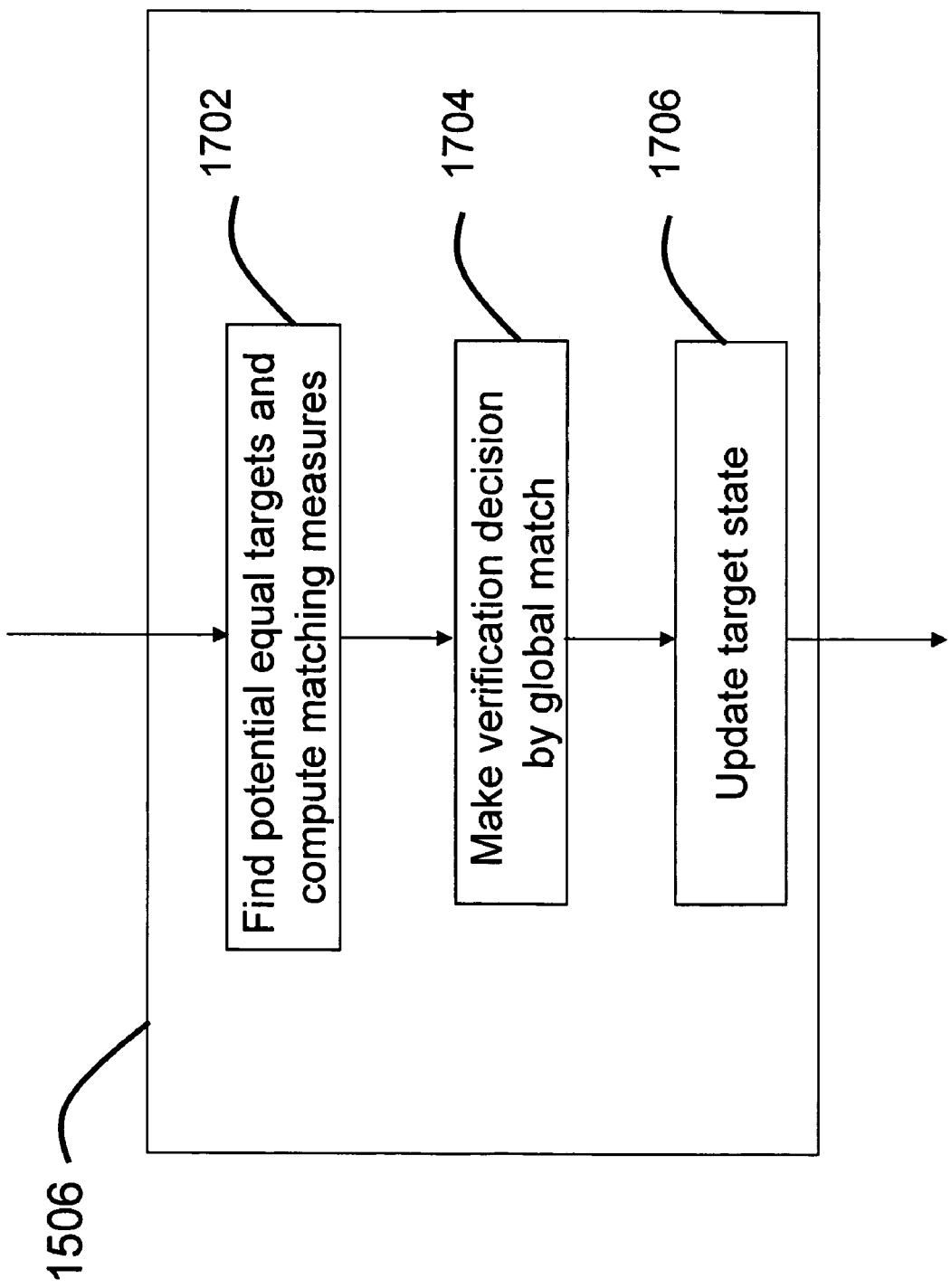
FIG. 17 depicts a conceptual block diagram of a target verification module according to embodiments of the invention.

Finally, OTM 1204 may have an occluded target verification module 1506 to keep on checking to see if an "occluded" target becomes fully "visible" again. FIG. 17 depicts a conceptual block diagram of a target verification module 1506 according to embodiments of the invention. The goal of the target verification module 1506 is to check if a new "visible" target actually corresponds to the same object indicated by a previous "occluded" or "disappeared" target. First, the system may need to find out all the possible "visible" and non-"visible" target pairs that might correspond to the same object and compute their matching measures 1702. Second, since targets may not be independent from one another, the system may need to compute the actual probability that two targets have an "equal" connection using some global consideration 1704. Two targets having an "equal" connection means that they represent two different temporal segments of a common physical object. Computing the probability of an "equal" connection is treated in further detail below. Last, the system may need to update both target state and target connection 1706, based on the target verification decisions 1704.

Note that the target verification process may be used in the OTM and/or in the DTM, in various embodiments of the invention. However, the target verification processes used in OTM and DTM may typically have different criteria and emphases when computing the target-to-target matching measures in block 1702. In the OTM, the "visible" targets to be considered may be those created by splits or merges, which means that they must have one or more "FromId"s at their creation time. For each of these new "visible" targets, the system may compute matching scores on every "occluded" target in the scene. A target-to-target matching score may be one or a combination of the following measurements: location match measure, appearance match measure, and connection match measure. Here, connection matching means to measure the connection levels between two targets. If two targets are not connected or directly connected, the probability that the two targets are "equal" targets is low.

Note that in the target occlusion case, location matching or connection matching alone may not reflect the true relationship of the two targets. For example, when a target changes direction or speed during an occlusion period, the location match may be very unreliable due to inaccuracy in the velocity used in the target location prediction, while at the same time, the connection data may provide more accurate information. In another case, if the target moves consistently but the scene is very crowded, the connection relationship may be noisy, but the predicted location match may be more trustworthy. Jointly considering these two matching techniques may provide a more reliable matching probability. One way to combine these two is to always choose the higher matching measure from the two as the joint location matching measure.

The overall probability of two targets being "equal" targets may be estimated globally using a best satisfaction metric. A best satisfaction score $S_{bs}$ may be defined as:

$$S_{bs} = S_{bms} + S_{bcs},$$

where $S_{bms}$ refers to the best matching score and $S_{bcs}$ refers to the best matching confidence score. $S_{bms}$ and $S_{bcs}$ may be further explained using the example illustrated in FIG. 18.

FIG. 18 shows an example of how one may compute the global matching probability between two targets using a best satisfaction metric according to some embodiments of the invention. In this example, there are three eligible new "visible" targets, denoted A, B, and C, and four potential matching "occluded" targets, numbered 1, 2, 3 and 4. Table 1802 lists exemplary target-to-target matching scores that may be obtained in computing matching measures 1702. Table 1804 list the derived best matching confidence score for each potential matching pair. The best matching confidence score may be determined as the mean difference score between the selected best matching score and the highest matching score in the corresponding row and column of the matching table excluding the current cell. For example, in FIG. 18, suppose that it is initially assumed that "visible" target C and "occluded" target 4 provide the best match; under this assumption, the best matching score is the cell C4 in table 1802, which equals 0.8, the next best matching score in the corresponding column of the cell, i.e., in column C, is 0.4, and the best matching score in the corresponding row of the cell, i.e., column 4, is 0.2. Consequently, the best matching confidence score for this pair is:

((0.8−0.4)+(0.8−0.2))/2=0.5.

Table 1804 lists the best matching confidence score for each target pair in Table 1802 (i.e., when it is assumed that each pair in Table 1802 provides the best match). Table 1806 lists the best overall matching satisfaction score for each target pair, computed using the equation discussed above.

Figure 19:
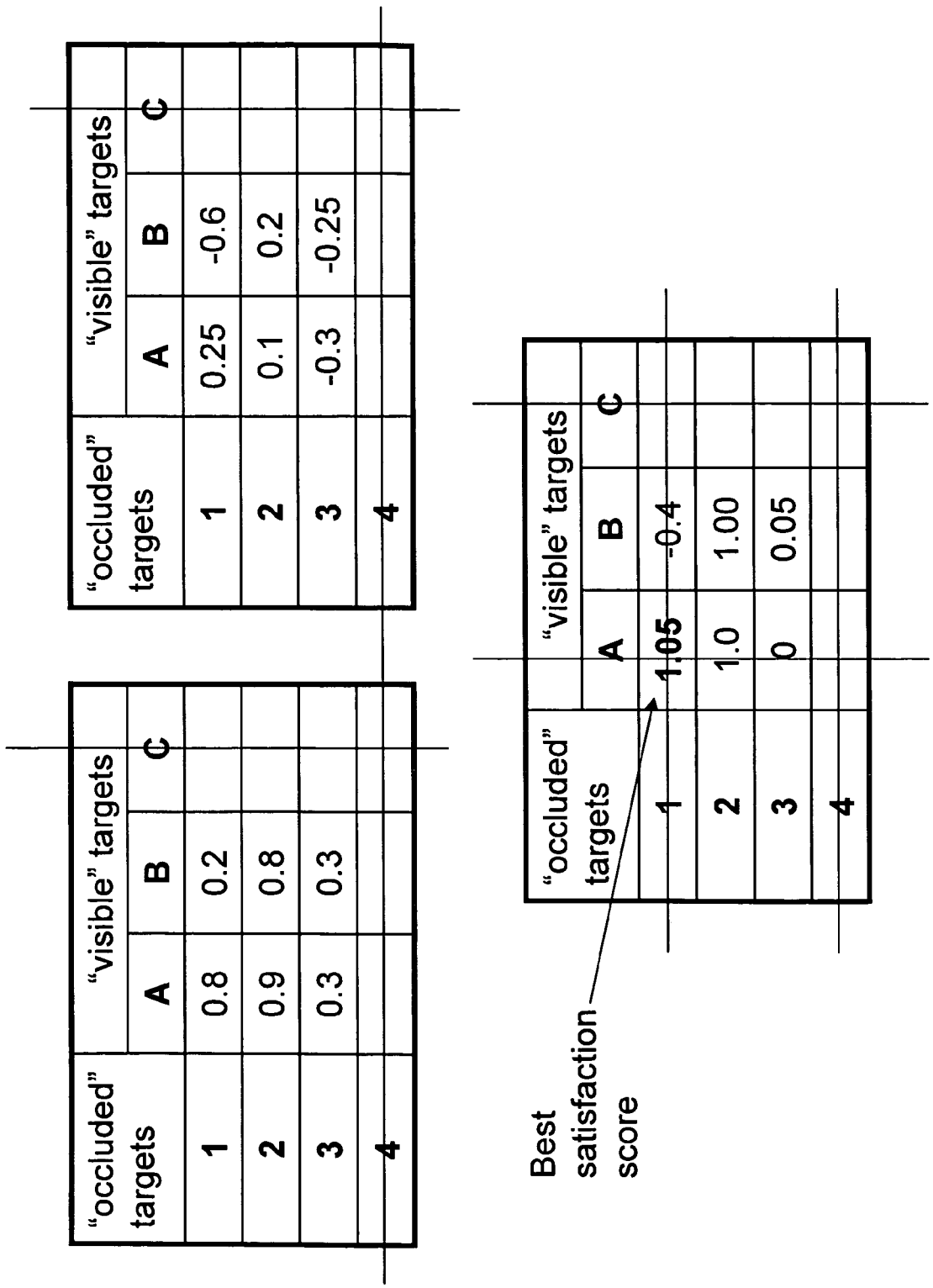
FIG. 19 shows a next iteration of a matching process for the example in FIG. 18 according to embodiments of the invention.

The system may iteratively find the best matching pair with the highest overall matching satisfaction score. In the above example, as shown in Table 1806, C4 has the highest matching score. If both the overall satisfaction score and the original matching score are higher than user adjustable parameters, the two targets in the pair may be considered to be "equal" targets, and the matching process may be started over again after removing the two "equal" targets from the table. Otherwise, the verification process may stop matching and may jump to block 1706 to update the states and connections of the "equal" targets. Assuming "visible" target C and "occluded" target 4 constitute a valid matching pair, FIG. 19 shows a next iteration of the matching process, in which only two "visible" targets and three "occluded" targets are included, and in which it may be shown that A1 turns out to be the best satisfaction matching pair.

Figure 20:
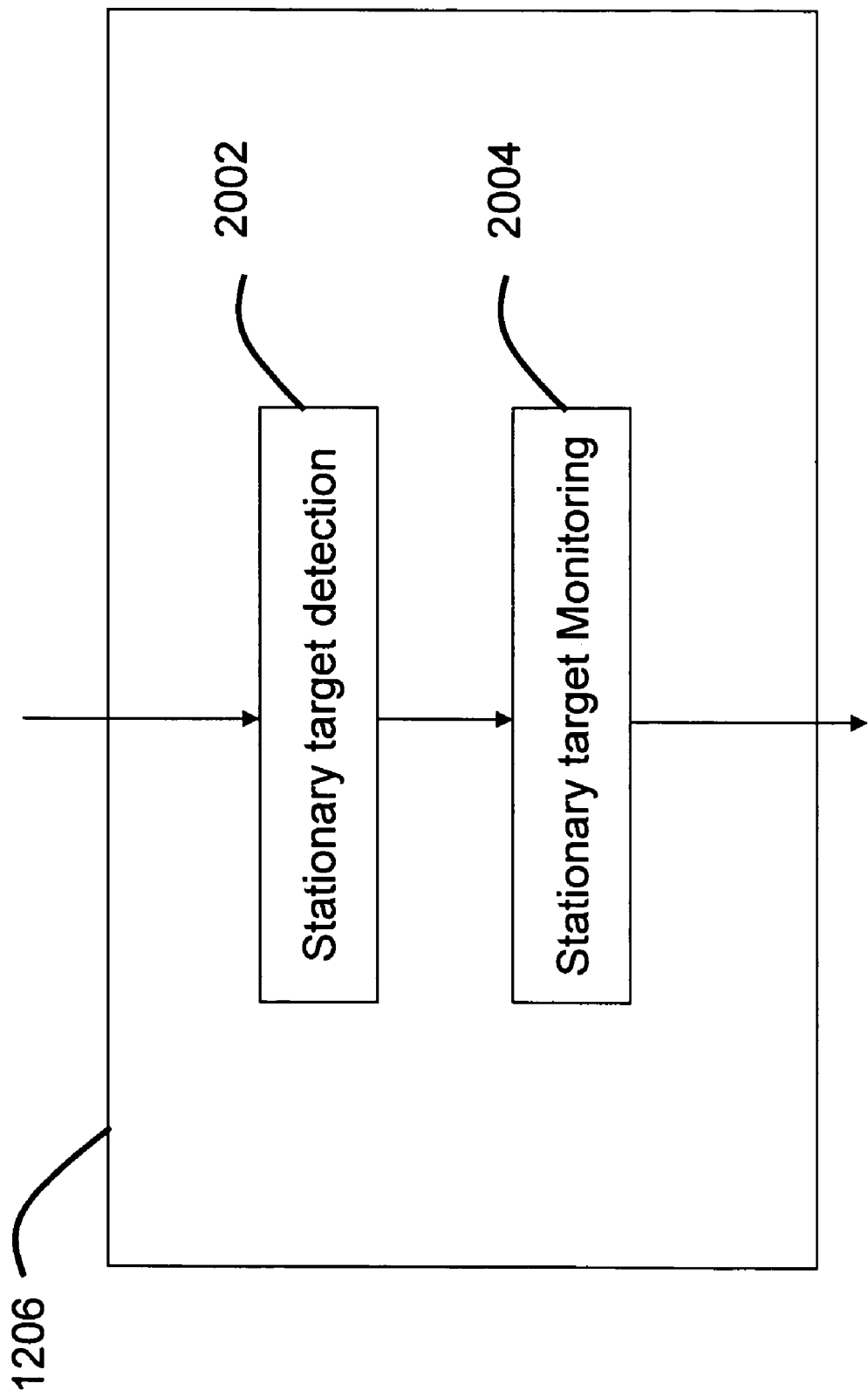
FIG. 20 depicts a conceptual block diagram of an stationary target manager (STM) module according to embodiments of the invention.

FIG. 20 depicts a conceptual block diagram of the STM module 1206 according to embodiments of the invention. At each timestamp, the STM may perform two major tasks: stationary target detection 2002 and stationary target monitoring 2004. Stationary target detection module 2002 may check each "visible" target to see if it becomes "stationary," while stationary target monitoring module 2004 may check every "stationary" target to see if it is still in the "stationary" state or if it has become "visible" or has "disappeared". A "stationary" target may have additional target properties in comparison with a non-stationary target, as described in block 508. An example of one such property is the background image, which is the corresponding area (i.e., to the target) in the system background scene model in the change detector 202. Note that the foreground image and the background image of a "stationary" target are using the same target mask. The foreground and background images are equally important for a "stationary" target because when the target become stationary, its foreground will be built into the background model and become the new background of the scene. When the "stationary" target start to move again, the "old" background in the background model would appear first as a strong indication of the "restarting" of the movement of the "stationary" target. This "old" background is actually the background image of the "stationary" target and may be stored in the "stationary" target throughout its "stationary" state.

Figure 21:
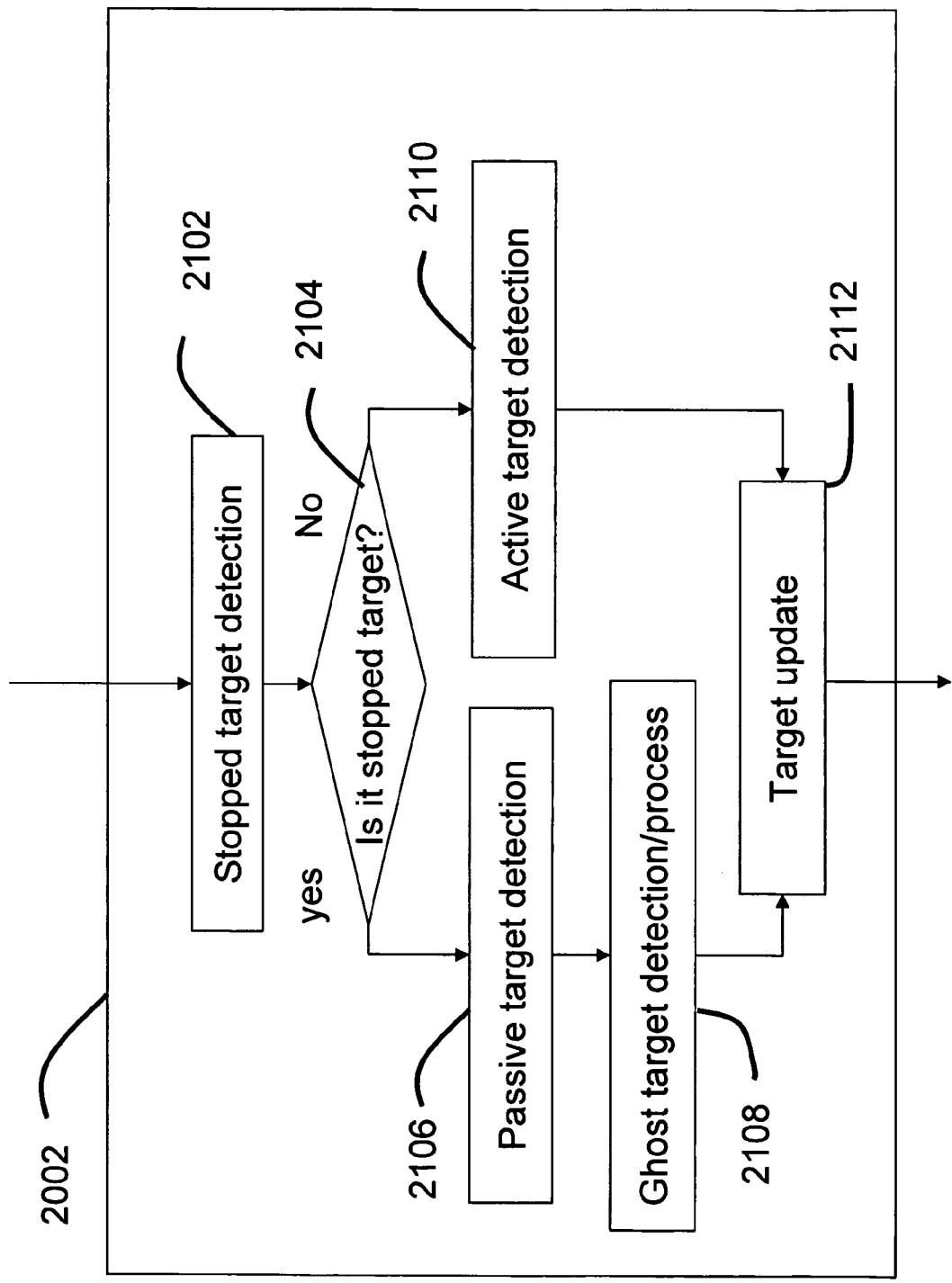
FIG. 21 depicts a conceptual block diagram of a stationary target detection module according to embodiments of the invention.

FIG. 21 depicts a conceptual block diagram of a stationary target detection module 2002 according to embodiments of the invention. First, the system may perform stopped target detection 2102 on "visible" targets; this will be discussed in further detail below. If a target under investigation is considered as stopped 2104, the system may further detect if it is a "passive" target 2106. "Passive" targets refer to those targets that can not move by themselves, such as bags, boxes, etc. On the contrary, we call those that can move by themselves "active" targets, such as humans and vehicles. This kind of target mobility property may be important when defining some events of interest, such as, but not limited to, being left behind or taken away. For example, if the goal of such event detections is to detect theft or suspicious left packages, the mobility state of the target may be used to distinguish a left box from a stopped vehicle. Another process that may need to be performed on the stopped target detected to be passive is to detect a "ghost" target 2108, where a "ghost" target indicates something that was previously part of the background but is not there any more. A "ghost" target may introduced by either an "active" target or a "passive" target.

If the "visible" target examined by block 2102 is not a stopped target, it may be further checked by module 2110 to see if it is an "active" target. All of the above detection results may be used to perform the target state update 2112.

Figure 22:
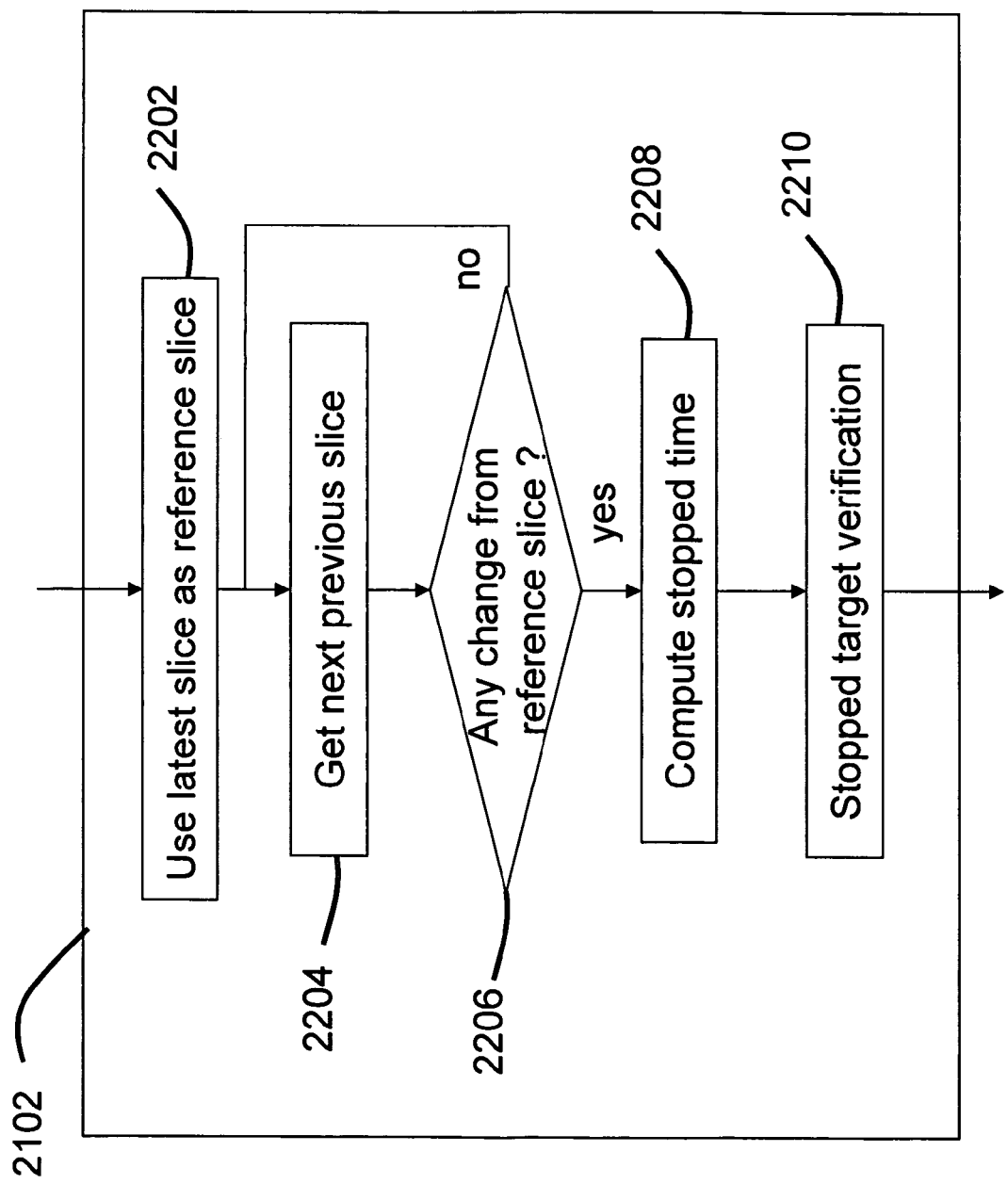
FIG. 22 depicts a conceptual block diagram of a stopped target detection module according to embodiments of the invention.

FIG. 22 depicts a conceptual block diagram of the stopped target detection module 2102 according to embodiments of the invention. This processed may be performed on each "visible" target in the video scene. First, a latest target slice of the target under investigation may be used as the reference slice 2202. Second, the scheme may obtain the next previous slice 2204 and may test to see if there are any changes in the target between the two timestamps 2206.

One or more criteria may be used in block 2206. A first criterion may be the distance between the centroid of the current slice and the centroid of the reference slice. This value divided by the average target size radius may be used to reflect the relative target displacement between the two timestamps. For a stopped target, the relative target displacement must be smaller than a user-controllable threshold. Target area ratio and target bounding box overlap ratio may also be used as criteria to detect a stopped target. These values must be close to one for a target to be truly stationary.

If there is no change between the current previous slice obtained in block 2204 and the reference slice, the algorithm may go back to block 2204 to obtain the next previous slice and to then test it in block 2206. Otherwise, this iterative testing may be stopped, and the target stopped time may be obtained 2208, which may be done by computing the time period between the reference slice and the first previous target slice that causes the testing of block 2206 to obtain a positive result (the timestamp of this first previous target slice to provide a positive result may be thought of the stopping time of the target). If the target stopped time is longer than a user-selected parameter, for example, one second, the target may be considered as a stopped target.

As described above, the target stopped time may be computed mainly based on the global motion of the target. The system may further perform stopped target verification 2210 by looking at the target internal motions during the stopped period. Since the target is stopped, the target mask, which may be one of the target properties 508 indicating the target area in each video frame, should be consistent over the stopping duration. For each pixel position inside the target mask, the system may compute the temporal intensity fluctuation during the stopping period. If this temporal intensity fluctuation is much bigger than that of an average background pixel, the corresponding pixel may be considered to be a moving pixel. In some embodiments of the invention, the determination of a target to be a true stationary target may require that the ratio of moving pixels be lower than a user-controllable parameter.

Figure 23:
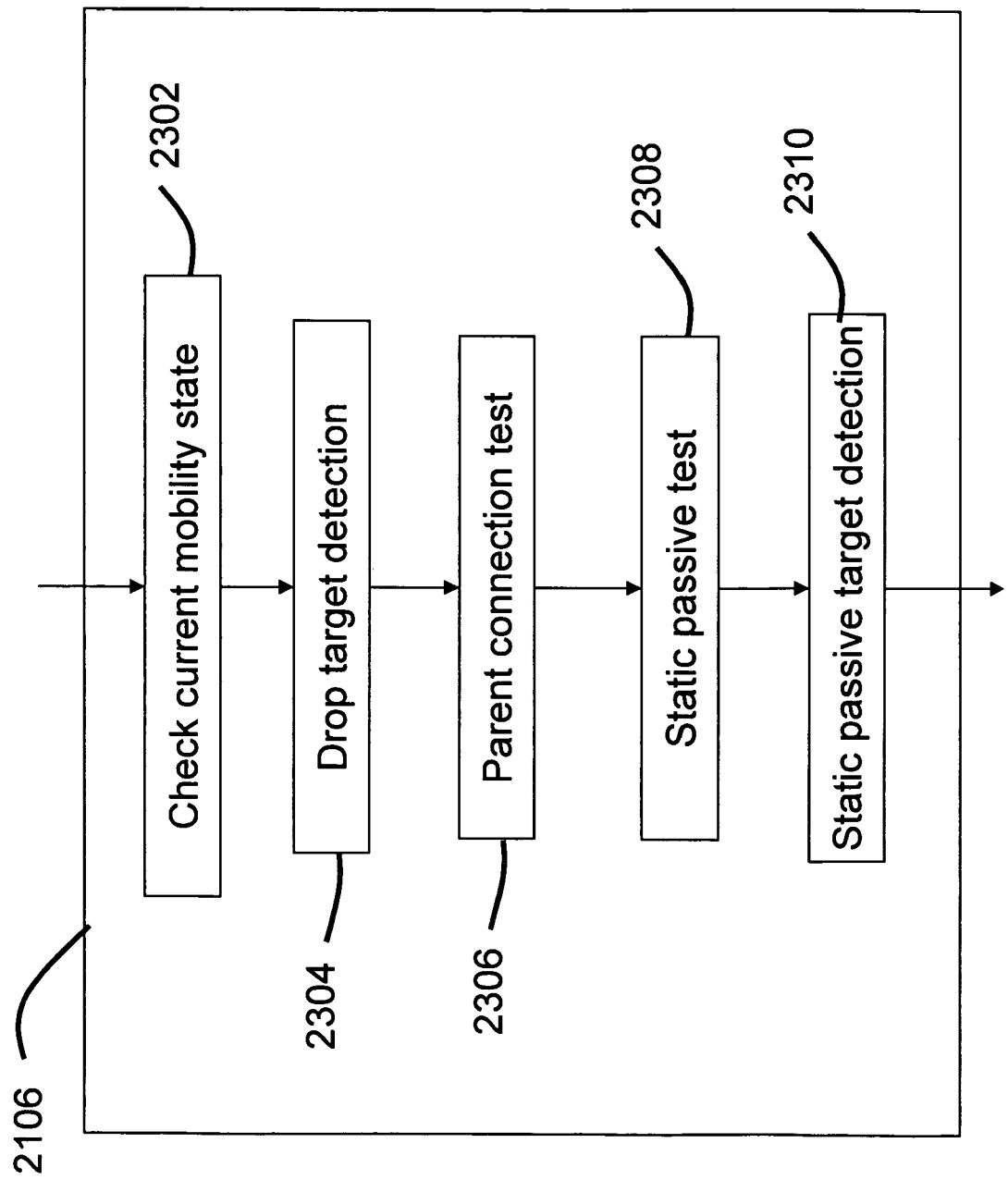
FIG. 23 depicts a conceptual block diagram of a passive target detection module according to embodiments of the invention.

FIG. 23 depicts a conceptual block diagram of the passive target detection module 2106 according to embodiments of the invention. Block 2302 may check the mobility state of the current stationary target. The process may not need to proceed if the mobility state has been determined before. As discussed above, a passive target may be defined as a target that can only be moved by outside force, and the source of this outside force may be denoted its parent target. Examples of passive targets include bags, suitcases, boxes, etc. Without outside forces, these objects would just be part of background. These objects may only be detected as targets of interest when taken away or left behind by other active objects, such as humans or vehicles. When a passive object been taken away, it is usually represented by a ghost target in the scene. The detection of a ghost target will be described below. When a passive object is left behind, it may become a stationary target. To detect this scenario, embodiments of the inventive process may consider two of the most common situations. One is that the object is thrown away; the other is that the object is left alone. Block 2304 may perform a test to see if the current stationary target is a thrown away or a dropped passive object, where its parent target may not be close to it or may not even be in the scene. In block 2304, a dropped target may be detected by measuring the target's velocity change before it stops. If the target has a large acceleration in the vertical direction, the target may be considered to be a dropped target. One way to measure the vertical acceleration is to jointly consider the acceleration of freefall constant g, which is approximately 9.8 meters per second squared, and the target height. If the target has a measured vertical acceleration close to the value associated with those numbers and suddenly stopped, it may be considered to be a passive target. If there is another active target nearby having larger size, this active target may be considered to be and may be marked as the detected passive target's parent target.

Blocks 2306 through 2310 may detect the left-alone passive target case. Two major conditions may need to be met to verify this scenario. The first is that the passive target have an associated parent target; the other condition is that the stationary target be static beginning with the time it first appears. Blocks 2306 and 2308 may be used to test these two conditions, respectively. Block 2306 may determine if the stationary target under investigation has a parent target or not. A parent may be its sole "from" target at the time the target under investigation first appears or may be the only target that is very close to the location at which the target under investigation first appears. Another requirement may be that a passive target be the same size as or smaller than its parent target. Next, block 2308 may determine if the target is stopped from the very beginning, which may be performed by looking at its centroid moving radius since the target birth time. If the centroid moving radius is less than one third of the target radius, the target may be considered as passive static. Here, the target radius may be approximated by using the square root of the target image area. If both parent test 2306 and static test 2308 are true, the stationary target may also be considered to be a passive target 2310.

Figure 24:
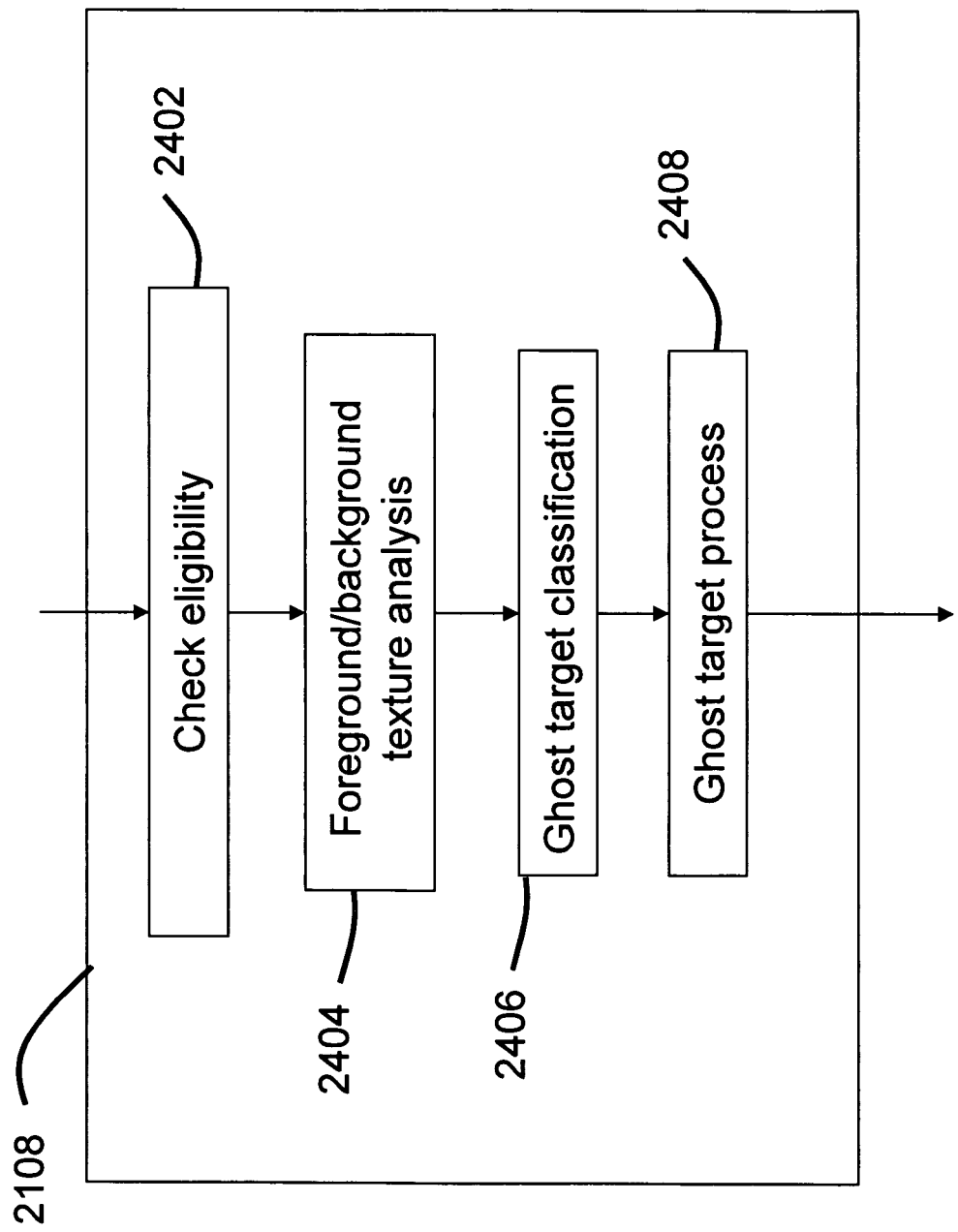
FIG. 24 depicts a conceptual block diagram of a ghost target detection and processing module according to embodiments of the invention.

FIG. 24 depicts a conceptual block diagram of a ghost target detection and processing module 2108 according to embodiments of the invention. Block 2402 may perform an eligibility check on the current stationary target under investigation. A ghost target may be created from a split and may only have one "FromId" at the time of its creation. If this is true, the process may further perform ghost target detection by means of foreground/background texture analysis 2404. A "ghost" target may be considered to be part of the background of the scene. It may be caused by some non-background object that was removed from the scene; for this reason, the "ghost" target may also be referred to as a "removal" target. In contrast, if a foreground object stopped moving, it may also become stationary, but it may still be different from its surrounding background, and this type of stationary target may be referred to as an "insertion" target. "Ghost" target detection may be used to separate "removal" targets from "insertion" targets. For this purpose, embodiments of the invention may perform texture analysis comparing a foreground target and its surrounding background; this will be described in further detail below.

After a "ghost" target been detected, it may be further classified 2406 as an active "ghost", which may be produced by an active target, or as a passive "ghost", which may produced by a passive target. Details on how one may classify the "ghost" targets are discussed in further detail below. Because a "ghost" target is actually part of the background, it may be processed right away 2408. For an active "ghost", it may be aligned with its corresponding real target; for a passive "ghost", the system may need to identify and keep its parent target. In both cases, the "ghost" target may be burned in.

FIGS. 25(a) and 25(b) show a pair of simulated scenarios of "ghost" (removal) stationary targets and non-"ghost" (insertion) stationary targets according to some embodiments of the invention. FIG. 25(a) illustrates a "ghost" target scenario. Block 2502 shows the "before" scene, in which a car has been parked in a particular location for a long time and has been treated as a part of the background in the scene model of the IVS system. Block 2504 shows the "after" scene, in which the car is moving away from its parked position. This movement may cause the system to detect two targets: the real target 2506 and the "ghost" target 2508. FIG. 25(b) illustrates an "insertion" target case. Block 2510 shows the "before" scene, in which there is no moving object in the background. Block 2512 shows the "after" scene, in which a car moved into the scene and stopped. The stopped car may also be detected as a stationary target 2514, but in this case, it is an "insertion" target. Note that for stationary targets 2508 and 2514, the corresponding background scenes may be illustrated by 2502 and 2510, respectively. The difference between the two types of stationary targets is illustrated by these figures: for a "ghost" stationary target, for example 2508, its foreground region the system computed is part of the road and the pine tree, which is actually part of the real background scene. This is because at this time, the system may consider the car as part of the background in the system scene background model, when the car moves away, the system may detect the changes where the car originally parked and consider that region as an object. In comparison, for an "insertion" stationary target, for example 2514, the foreground is the actual real object and at the detection time, the system background scene model is also corresponding to the actual background scene, that is, the road and the tree.

As mentioned above, foreground/background texture analysis 2404 may be used to distinguish these two scenarios. A texture analysis that may be used for this purpose may include boundary edge analysis and intensity histogram analysis. To perform these analyses, it may be useful to define two measurements: boundary gradient intensity and fg/bg histogram similarity. These will be discussed in connection with FIGS. 26 and 27.

Figure 26:
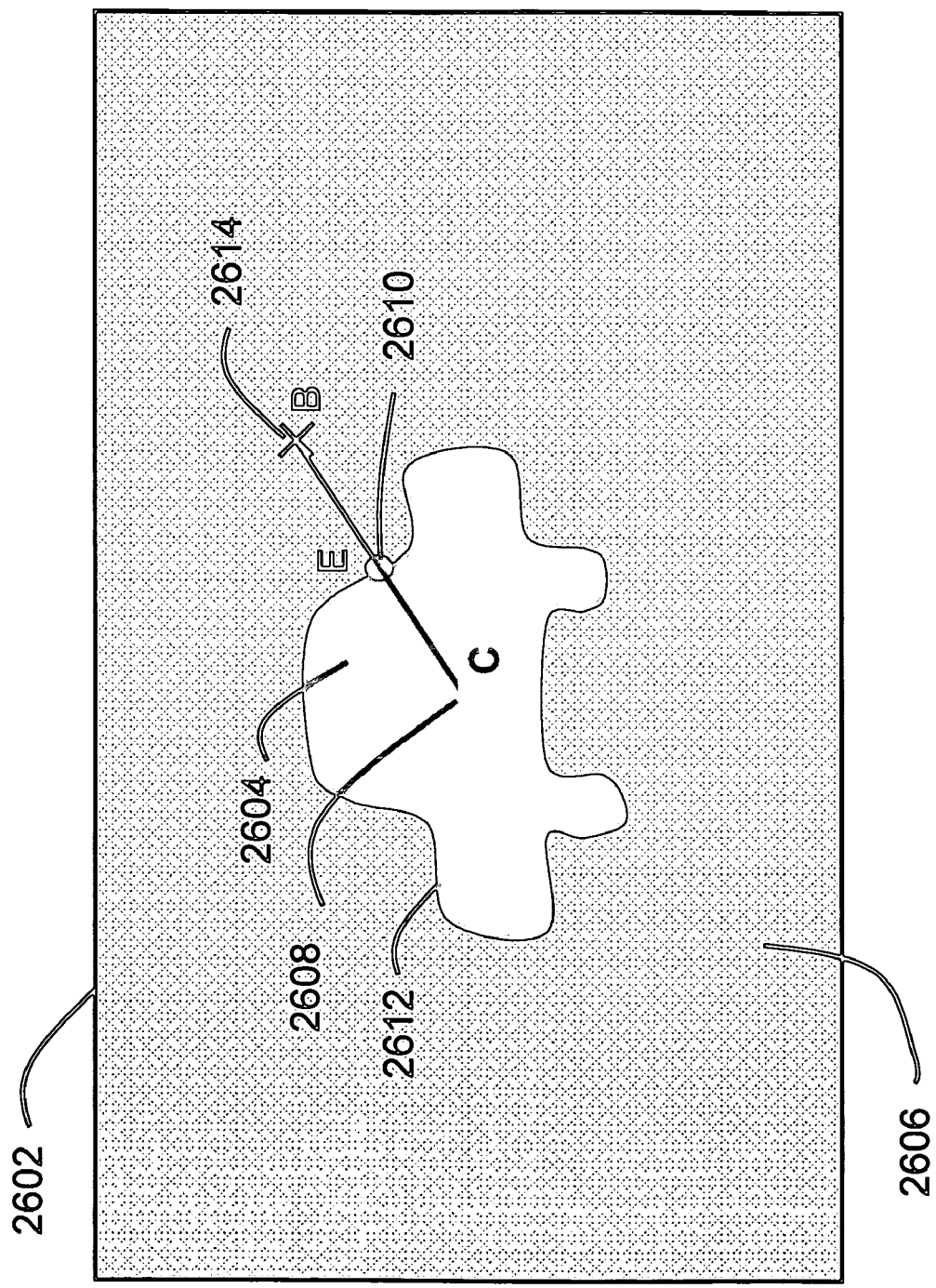
FIG. 26 illustrates how to compute boundary gradient intensity according to some embodiments of the invention.

FIG. 26 illustrates how to compute boundary gradient intensity according to some embodiments of the invention. Reference numeral 2602 refers to a video frame; 2604 indicates what may constitute the mask of a stationary target under investigation; 2606 indicates a background portion of a video scene model corresponding to video frame 2602; 2608 indicates the center of the stationary target, denoted as C; 2610 indicates what may constitute one of the boundary points of the target, denoted as E; and 2612 indicates what may constitute the boundary of the target. Next one may draw a line from C to E and may further extend the line to the background point B, marked by reference numeral 2614, such that the line segment EB has the same length as line segment CE. A boundary gradient intensity may be defined as the absolute difference between the mean pixel intensity value along the line CE and the mean pixel intensity value along the line BE. According to some embodiments of the invention, for each stationary target, two boundary gradient intensity values may be obtained, where one may be computed from the current image frame, and the other may be computed from the current background scene model. These two boundary gradient intensity values may be denoted the "frame boundary gradient intensity" and "model boundary gradient intensity," respectively.

Figure 27:
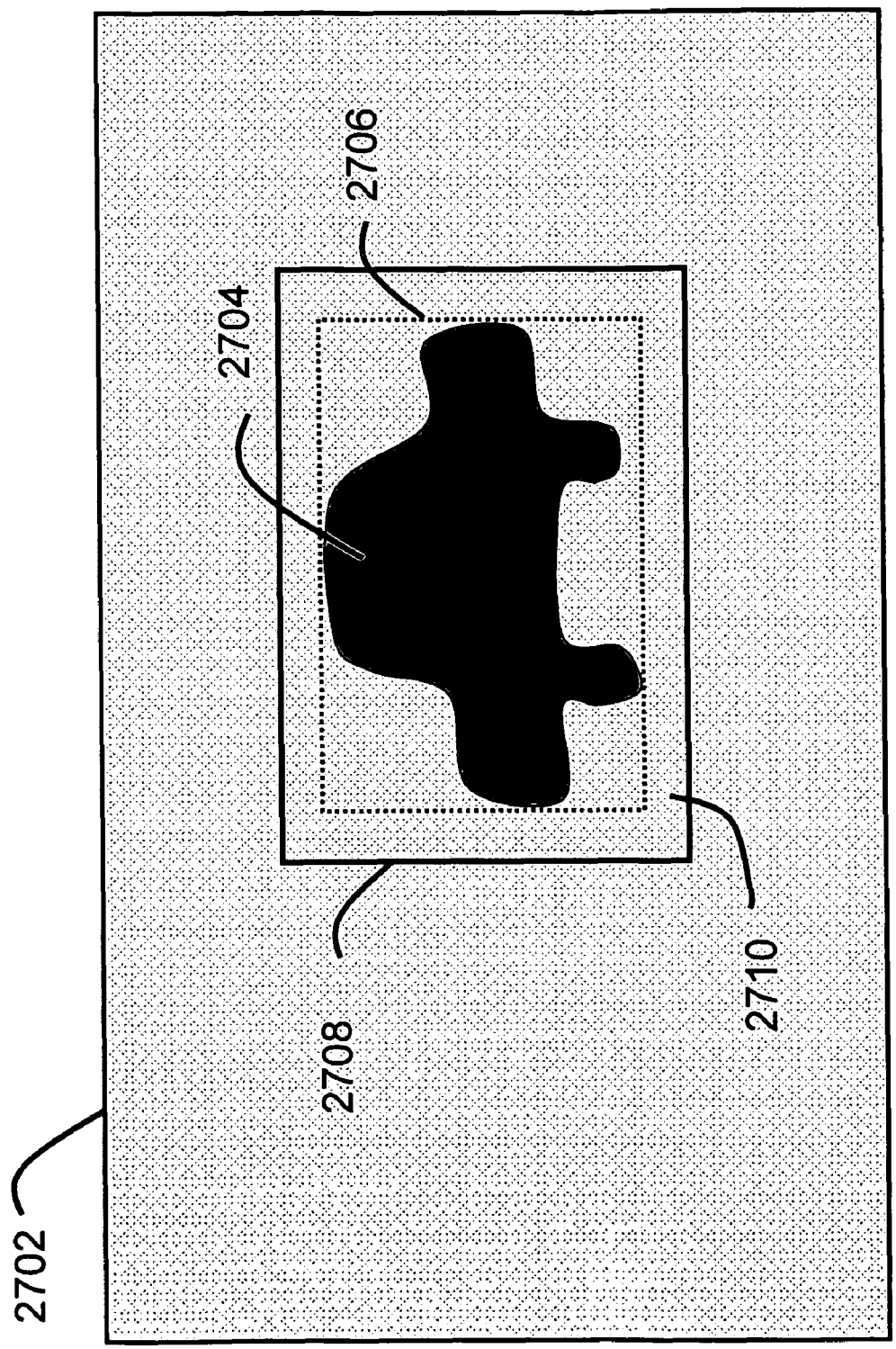
FIG. 27 illustrates how to compute foreground/background (fg/bg) histogram similarity according to some embodiments of the invention.

FIG. 27 illustrate how to compute fg/bg histogram similarity according to some embodiments of the invention. Reference numeral 2702 refers to a video frame; 2704 indicates the mask of a stationary target under investigation; and 2706 indicates the bounding box of the stationary target. To compute the surrounding background histogram of the stationary target, we may extend the target bounding box outward to a new, extended bounding box 2708 so that the area it encloses increases; in some embodiments strength measurement on the true scene background; a high value indicates a strong textured background, which implies that the boundary gradient intensity measurement is not very reliable for use in detecting the "ghost" target in the current situation. For the fg/bg histogram similarity based decision, the confidence may be based on the smaller value of the two fg/bg similarity measurements. This smaller value is supposed to be the similarity between the actual foreground object and the background scene; a high value indicates that the foreground may have similar color to the background, which implies that in this case it might not be reliable to use the fg/bg similarity measurement to detect the "ghost" target.

Figure 28:
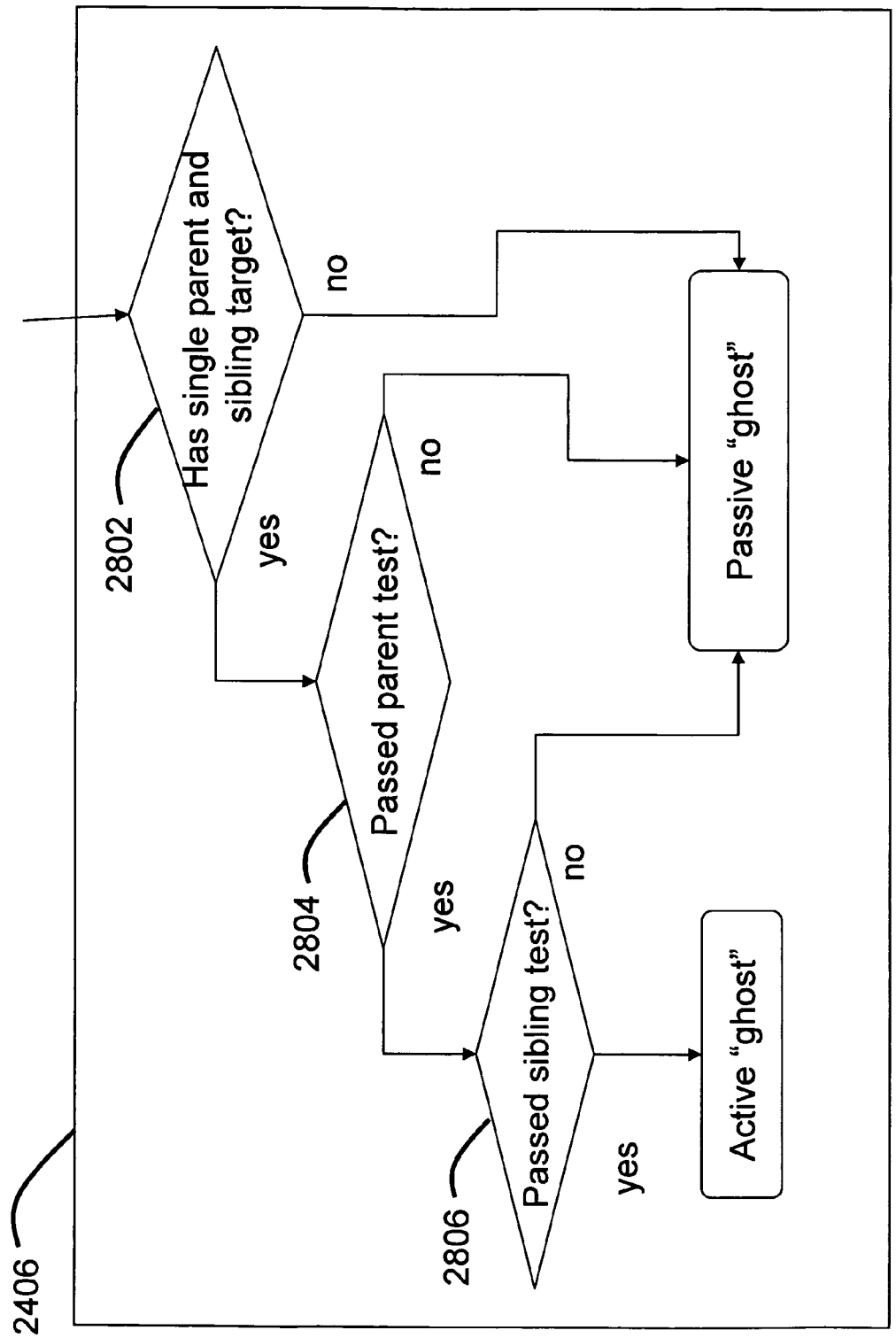
FIG. 28 depicts a conceptual block diagram of a "ghost" target classification module according to embodiments of the invention.

FIG. 28 depicts a conceptual block diagram of a "ghost" target classification module 2406 according to embodiments of the invention. First, block 2802 may be used to check if the "ghost" target is created from splitting from one parent target, in which case, at its creation time, it would have one and only one sibling target. If this condition is satisfied, next, block 2804 may further test the parent target to see if it satisfies two criteria. The first criterion is that the parent target should be spatially overlapped with the "ghost" target when the parent target first enters the "stable" stability status, as discussed above. The first criterion may imply that the parent target's birthplace in the image should be around the "ghost" target's location. The second criterion is that the parent must not be in the "visible" state when the "ghost" target is created; this means that the parent target must be split into the "ghost" target and its sibling target. If this test is also passed, block 2806 may be performed to further test the sibling target. If the size of the sibling target is within some predetermined range, which may be a user-defined range, of that of the "ghost" target, and if its foreground histogram of the invention, the area of extended bounding box 2708 may be double that of bounding box 2706, but the invention need not be thus limited. The foreground histogram may be formed based on the intensities of all the pixels in the target mask area 2704. The surrounding background histogram may be formed by using the intensities of all the pixels within the extended bounding box 2708 but not in the target mask area 2704. The fg/bg histogram similarity may be obtained by computing the correlation between the two histograms. For each stationary target, two fg/bg histogram similarity measurements may need to be computed, one based on the current video frame and one based on the current scene model. They may be denoted as frame fg/bg histogram similarity and model fg/bg histogram similarity.

To detect whether a stationary target is a "ghost" target, one may jointly consider the two sets of texture analysis measurements. For a "ghost" target, its frame boundary gradient intensity is likely to be lower than its model boundary gradient intensity, and its frame fg/bg histogram similarity is likely to be higher than its model fg/bg histogram similarity. For an "insertion" target, one is more likely to get the opposite observations. Because a "ghost" target is actually one patch in the background scene, it may correspond to a lower frame boundary gradient intensity and a higher fg/bg histogram similarity. This may be used as the rule to detect the "ghost" target. If the two measurements provide contradictory decisions, we may further use their associated confidences to make the final decision, where more weight may be given to the decision with higher confidence. For the frame boundary gradient intensity measure based decision, the confidence may be based on the smaller value of the two boundary gradient intensity measurements. The smaller value of the two is supposed to be the texture matches well (a matching criterion according to some embodiments of the invention will be discussed below) with the "ghost" target's background histogram, the "ghost" target may be considered to be an active "ghost" target. Otherwise, if any of the tests in blocks 2802, 2804 and 2806 failed, the "ghost" target may be considered to be a passive "ghost" target. For the active "ghost" target, its parent target and sibling target are actually "equal" targets. In practice, this may indicate a "moving away" case, while the passive "ghost" target may indicate a "taken away" case.

Additionally, further testing may be performed to see if the "ghost" target corresponds to a "stationary" target under monitoring. If the background of the "ghost" target matches well with the foreground of a "stationary" target in the same location, the "stationary" target may be considered as having been taken away by the parent target of the "ghost" target. Here, as well as in the preceding paragraph, "match well" may, according to some embodiments of the invention, mean that there is a good appearance match as well as a good size and location overlap match, and what is "good" may be determined according to one or more user-selected parameters.

Figure 29A:
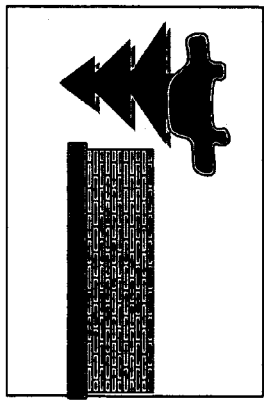
FIG. 29(a)-29(d) show an example of how an active "ghost" target may be produced and the relationship among the "ghost" target, its sibling target and the parent target, according to embodiments of the invention.
Figure 29B:
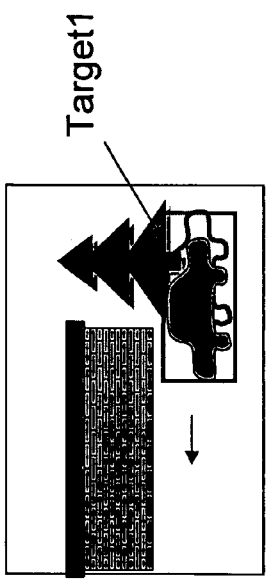
Figure 29C:
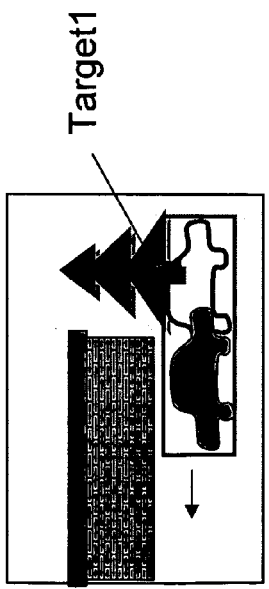
Figure 29D:
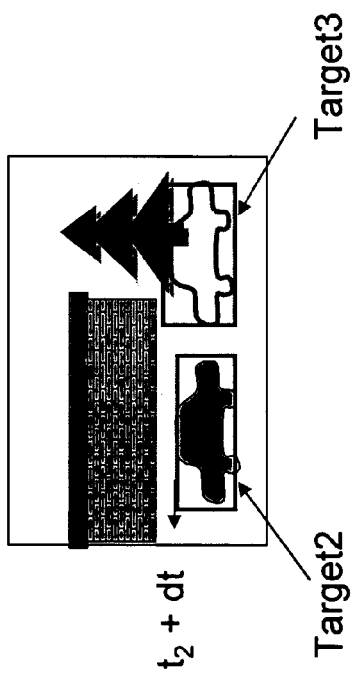

FIGS. 29(a)-29(d) show an example of how an active "ghost" target may be produced and the relationship among the "ghost" target, its sibling target and the parent target, according to embodiments of the invention. Before time t0, the car in FIG. 29(a) is not moving, and it is considered as being part of the background scene. At time t1, the car starts moving, as shown in FIG. 29(b), causing significant scene changes around the area of the car, and this may be detected by the system as a new target, denoted Target 1. At time t2, as shown in FIG. 29(c), Target 1 may continue to be tracked. Note that the target may contain both the real body and its ghost detected by the change detector. At time t3, as indicated in FIG. 29(d), the real body of the car and the ghost may split into two blobs, which may be considered as two new targets: Target 2 and Target 3. Here, Target 3 is the "ghost" target, Target 2 is its sibling target and Target 1 is their common parent target. And in this case, Target 3 is an active "ghost" target, which may imply that Target 2 and Target 1 are "equal" targets.

Figure 30:
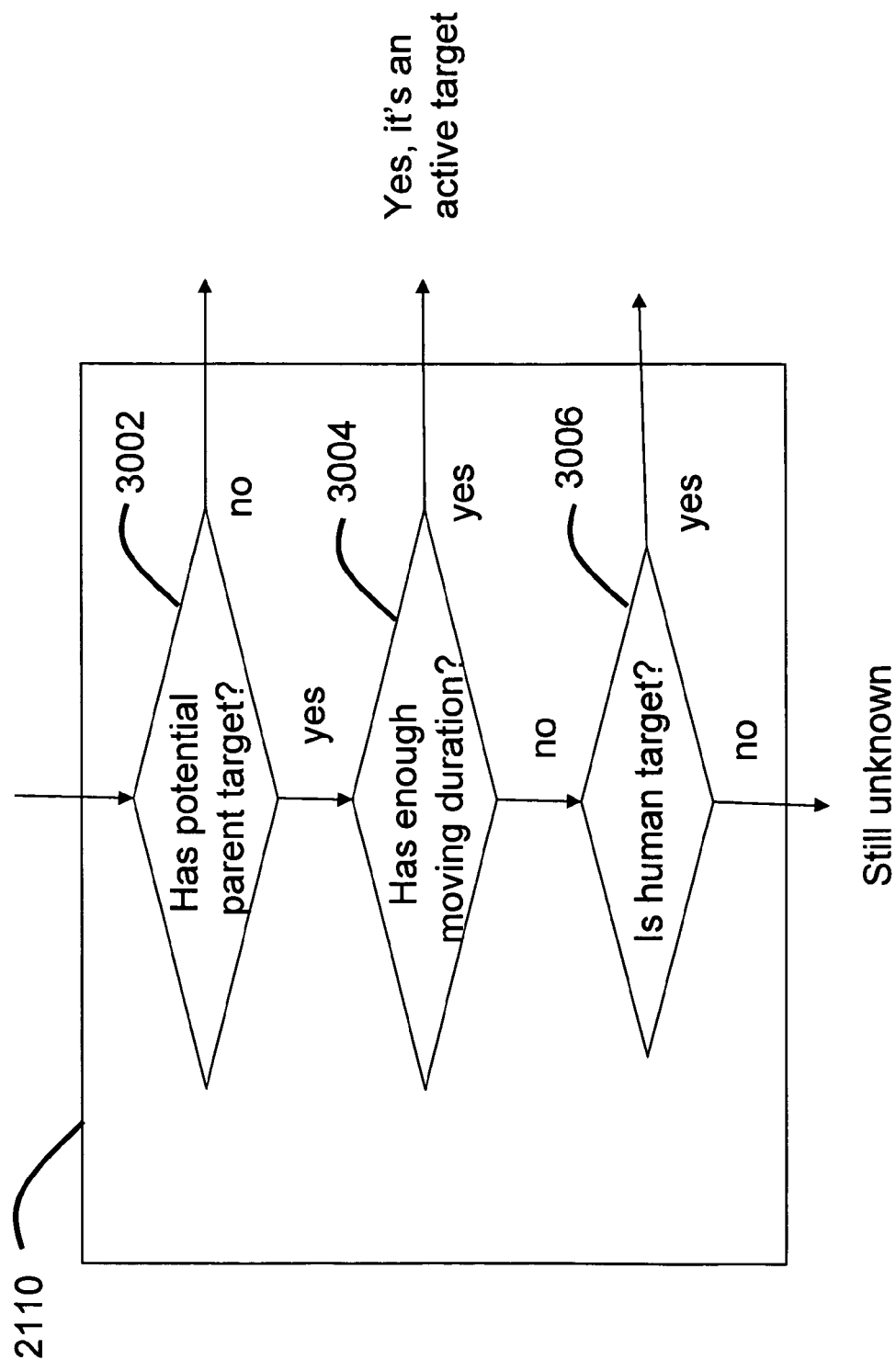
FIG. 30 depicts a conceptual block diagram of an active target detection module according to embodiments of the invention.

FIG. 30 depicts a conceptual block diagram of an active target detection module 2110 according to embodiments of the invention. First, block 3002 may be used to detect if the current non-stationary target has any potential parent target. A potential parent target is any nearby target that is the same size as or bigger than the current target when the current target first appears. If the current target does not have any potential parent target, it may be considered to be an active target. Otherwise, the target may be further investigated to check how long it has been moving 3004. If it has been in the moving state longer than a user-controllable parameter, it may also be considered to be an active target. Otherwise, a human detection 3006 may be performed to see if the current target is a human target. Human head detection and/or human profile analysis may, for example, be used for this purpose, as may be well-known face detection methods; however, the invention is not limited to such embodiments. A human target may always be considered to be an active target. Other specific target detectors, for example, but not limited to, a vehicle detector, may also be used here to further detect other types of active targets. If the system still can not determine the mobility type of the target, the target may continue to be in the "unknown" state.

If a "visible" target is detected as stationary and it is not a "ghost" target, its target state may be changed from "visible" to "stationary". Extra target features may be extracted from the image and stored in the "stationary" targets, such as the background image of the target, which may be extracted from the current background scene model. At the same time, the whole "stationary" target will be burned into the background model, which means it will only be visible to STM 1206 and not to other tracking modules and targets any more. All the "stationary" targets may then be monitored by the stationary target monitoring module 2004 of the STM 1206 until they move again or disappear from the scene.

Figure 31:
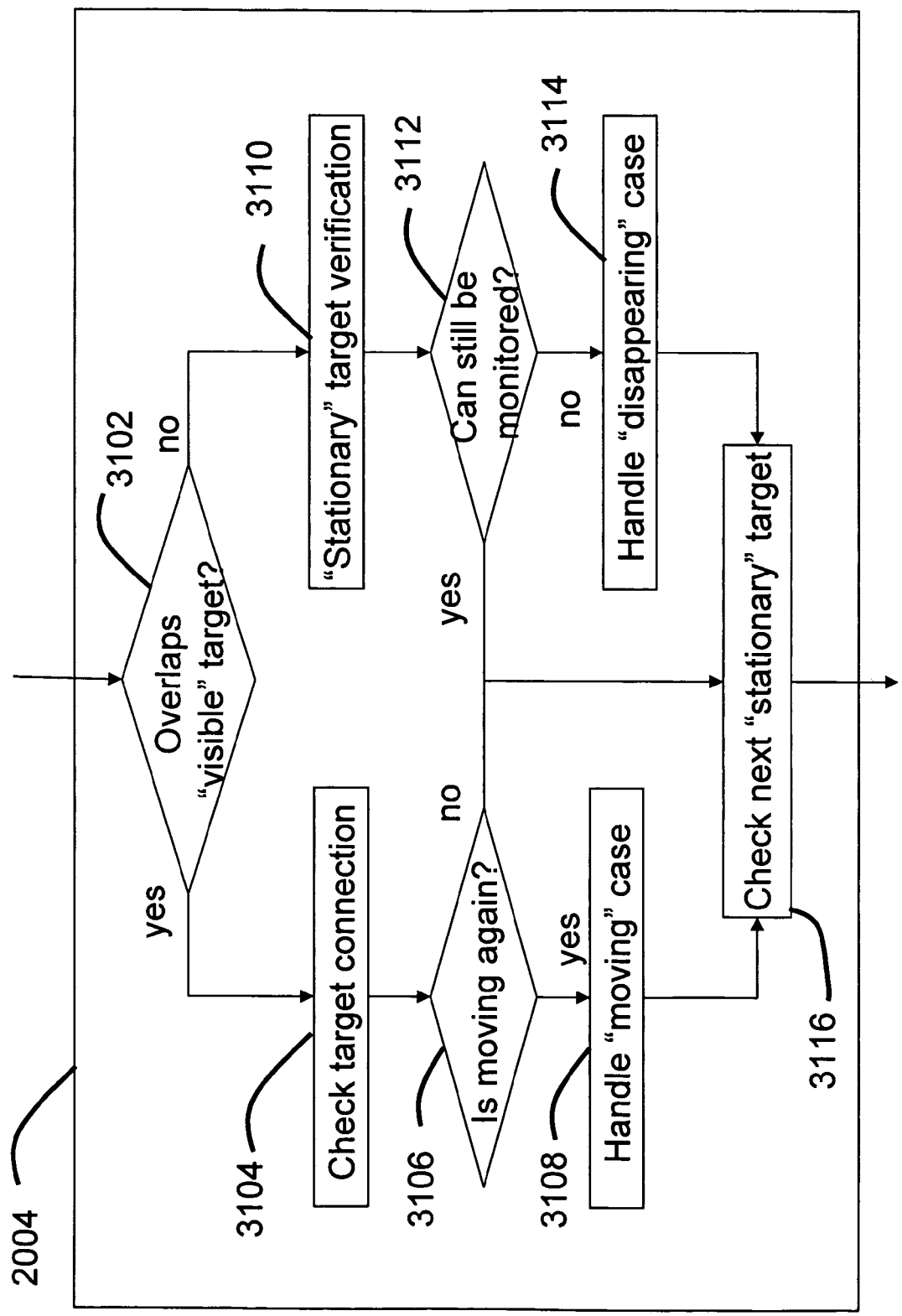
FIG. 31 depicts a conceptual block diagram of a stationary target monitoring module according to embodiments of the invention.

FIG. 31 depicts a conceptual block diagram of a stationary target monitoring module 2004 according to embodiments of the invention. First, for each "stationary" target, block 3102 may search the current "visible" target list to see if there is any "visible" target spatially overlapping with the "stationary" target under investigation. If there is an overlapping "visible" target, the process may proceed to check the relationship between the overlapping "visible" target and the "stationary" target under investigation, which may be done in block 3104. There are three possible relationships between the two: first, the "visible" target is the "stationary" target; second, the "visible" target is not the "stationary" target but causes the "stationary" target to start moving again; and last, the "visible" target is just a pass-by target, where there is no change to the "stationary" target. More details on how to determine the three relationships will be provided below. Both the first and second relationships may indicate that the "stationary" target will start to move again, and this may be detected 3106, and the case in which the "stationary" target begins to move again may be further handled by block 3108.

In the first case, the "stationary" target may start to move again, and this is actually the cause of the appearance of the new corresponding "visible" target. One way to handle this scenario may be to change the "stationary" target state to "visible" and to mark the corresponding "visible" target as "expired", and at the same time, to update the corresponding portion of the background scene model using the background image of the current "stationary" target. This may be referred to as "process activation." Thus, in the following frame after process activation, the previous "stationary" target will be detected again by the change detector, and will further be updated by the VTM 1202.

In the second case, the overlapping "visible" target is different from the "stationary" target, and the process may perform no action on the "visible" target but may only activate the "stationary" target. Consequently, in the next frame, the two targets may occlude each other and may both to be changed to be in the "occluded" state, which would be handled by OTM 1204. If the overlapping "visible" target has no association with the "stationary" target under investigation, the process may proceed to check the next "stationary" target 3116.

If block 3102 did not find any overlapping "visible" target, "stationary" target verification 3110 may next be performed. Two measurements may be computed in block 3110. One may be termed the "foreground same ratio," and the other may be termed the "background reappear ratio." For each pixel location on the target mask, if the current frame pixel value is approximately to the original foreground value for this location, it may be considered to be a foreground same pixel. One criterion to determine if the values are approximately equal is to use two times the background pixel standard deviation as a threshold. If the difference is less than the threshold, it may be considered as similar enough. The foreground same ratio is defined as the total number of foreground same pixels divided by the total number of foreground pixels. If this number is close to one, the "stationary" target may be considered to be verified. Similarly, we may also compare each current frame pixel value inside the target mask with its corresponding background scene model value. If the difference is smaller than the threshold discussed above, this pixel may be considered to be a background reappear pixel. The background reappear ratio is defined as the total number of background reappear pixels divided by the total number of foreground pixels.

The process may then proceed with block 3112, which may be used to check if the STM 1206 is still able to monitor the current "stationary" target. If, for some reason, the background reappear ratio is higher than a user-defined threshold, or if the "stationary" target has not been verified for a user defined time period, for example, one minute, the "stationary" target may be considered to be "disappeared," and its target state may be switched to the "disappeared" state in block 3114. Note that the condition in which a "stationary" target can not be verified is not the same as the condition that a "stationary" target can not be monitored. If a "stationary" target loses verification for a short period due to occlusions or illumination fluctuations, it may re-obtain verification when the occluding target(s) have left or when the illumination becomes stable. But when a "stationary" target loses verification for a long time, it may indicate that the target occlusion or illumination change is permanent, in which case continued monitoring may become unreliable.

Figure 32:
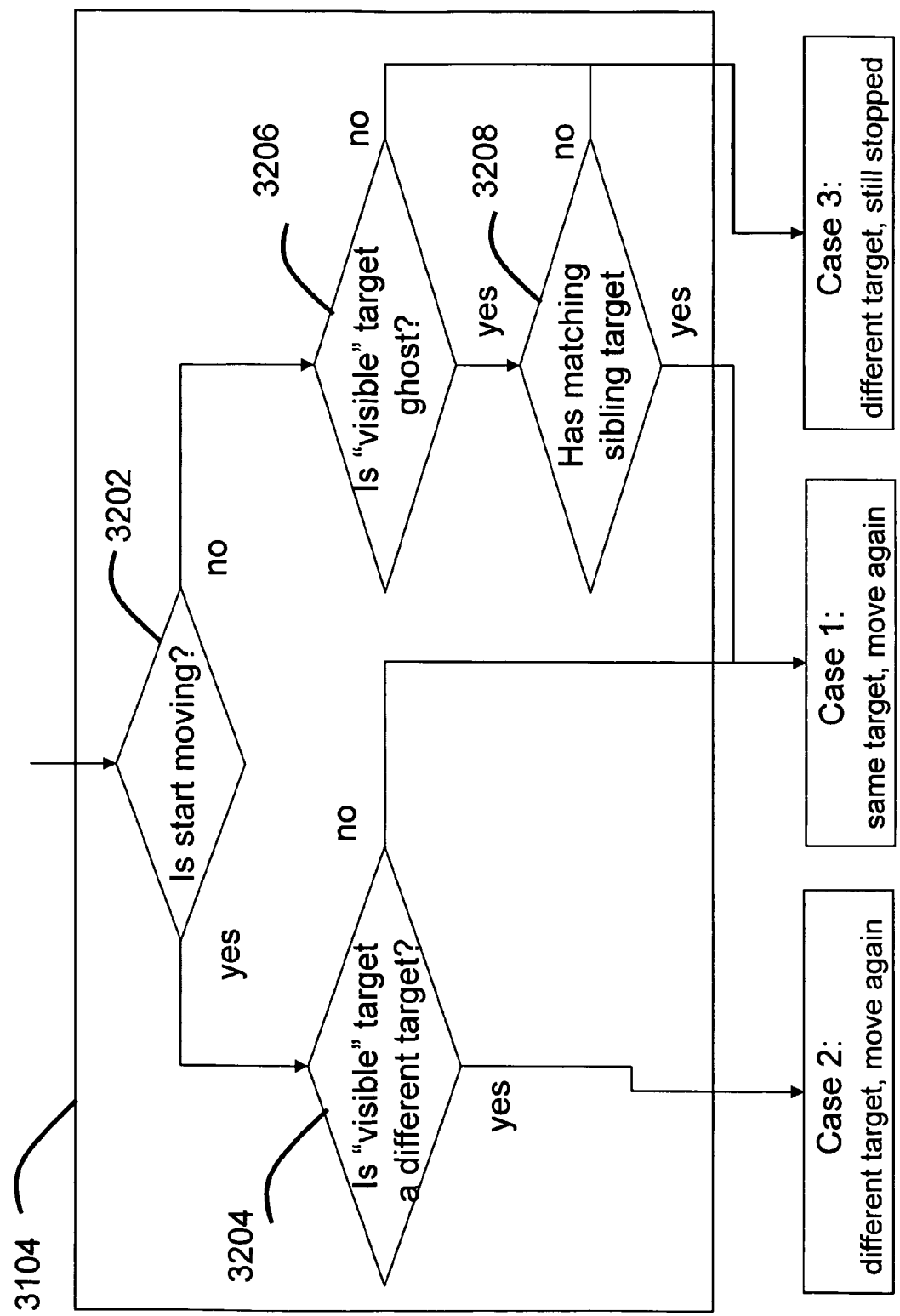
FIG. 32 depicts a conceptual block diagram of a process module to determine a relationship between a "stationary" target and its overlapping "visible" target according to embodiments of the invention.

FIG. 32 depicts a conceptual block diagram of a module that may correspond to block 3104, according to embodiments of the invention. Block 3202 may detect if the "stationary" target starts moving again. This may be detected by comparing the current image frame with the original background scene model over the target mask region. To provide a reliable and prompt detection, this process may be performed using only target boundary regions.

Figure 33:
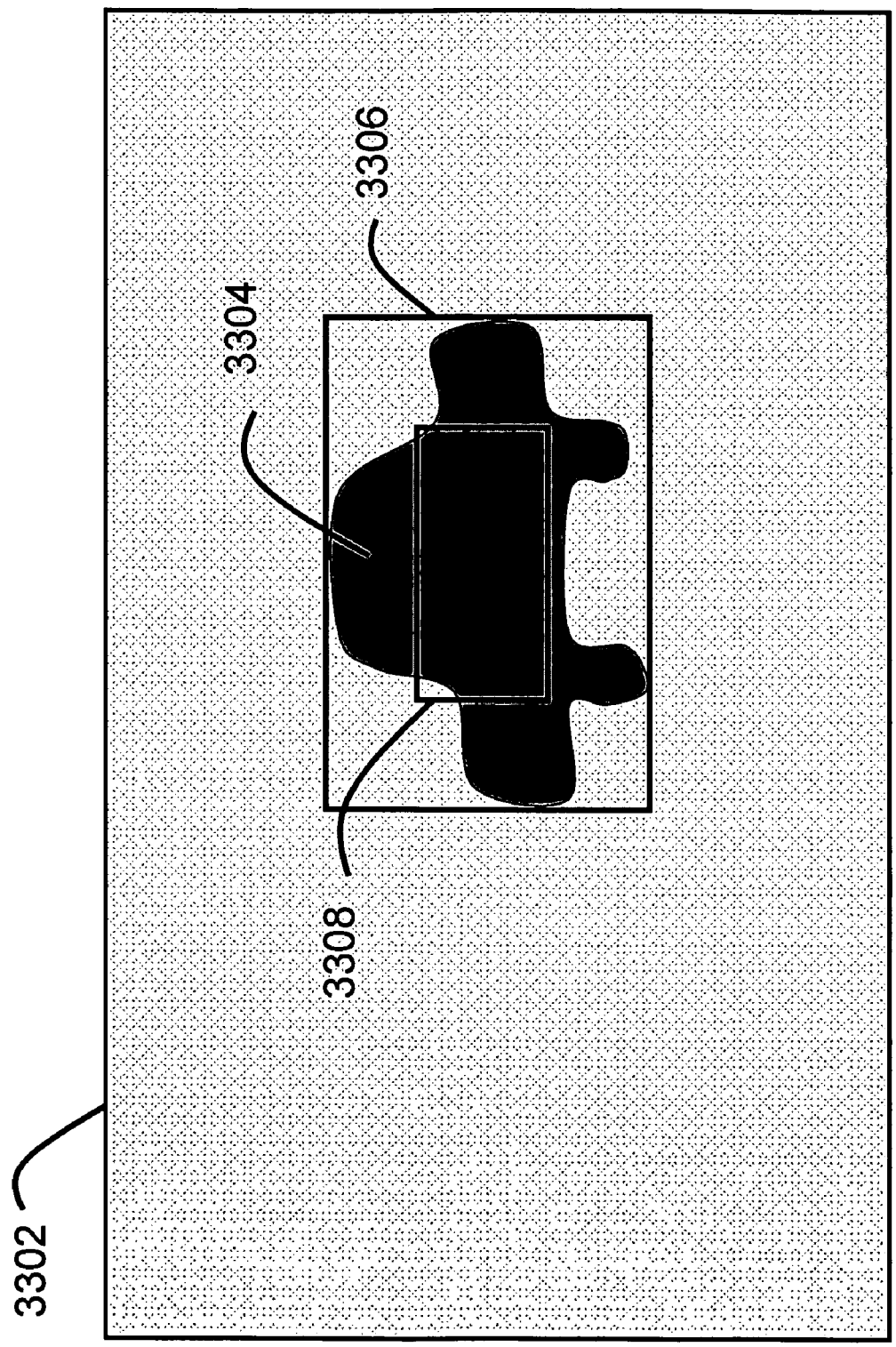
FIG. 33 illustrates how to define a target boundary region according to embodiments of the invention.

FIG. 33 illustrates how to define a target boundary region according to embodiments of the invention. In an image frame 3302, one "stationary" target 3304 is shown as already having a bounding box 3306, and one may further define an inner box 3308 such that the target area between each pair of edges is a fixed fraction of the total target area. In a particular implementation, one may choose 0.1 as the fraction value. One may then define the left edge of an inner box by scanning the target mask from left to right until the accumulated target area is one-tenth of the total target area. The top, right and bottom edge positions of the inner box may be obtained similarly. The target bounding box 3306 and the inner box 3308 may be used to define the left, top, right and bottom target boundary regions. To detect if the target starts to move again, one may just check the four boundary regions to see if any of the four regions matches the original background scene model. Using this method, any movement of the "stationary" target will be detected promptly, regardless of direction of movement.

If it is determined that the "stationary" target has started moving, block 3204 may further check if the overlapping "visible" target is from the same physical object as the moving "stationary" target. If the "visible" target is created inside the "stationary" target bounding box and the target area is smaller than that of the corresponding "stationary" target, the "visible" target may be considered to be the same object as the moving "stationary" target, and its appearing is directly associated with the movement of the "stationary" target, which refers to Case 1 in FIG. 32. Otherwise, the overlapping "visible" target may be a different target, which corresponds to Case 2 in FIG. 32. The overlapping "visible" target in this case may be a target providing an outside force to move the "stationary" target away from its original location.

Figure 34:
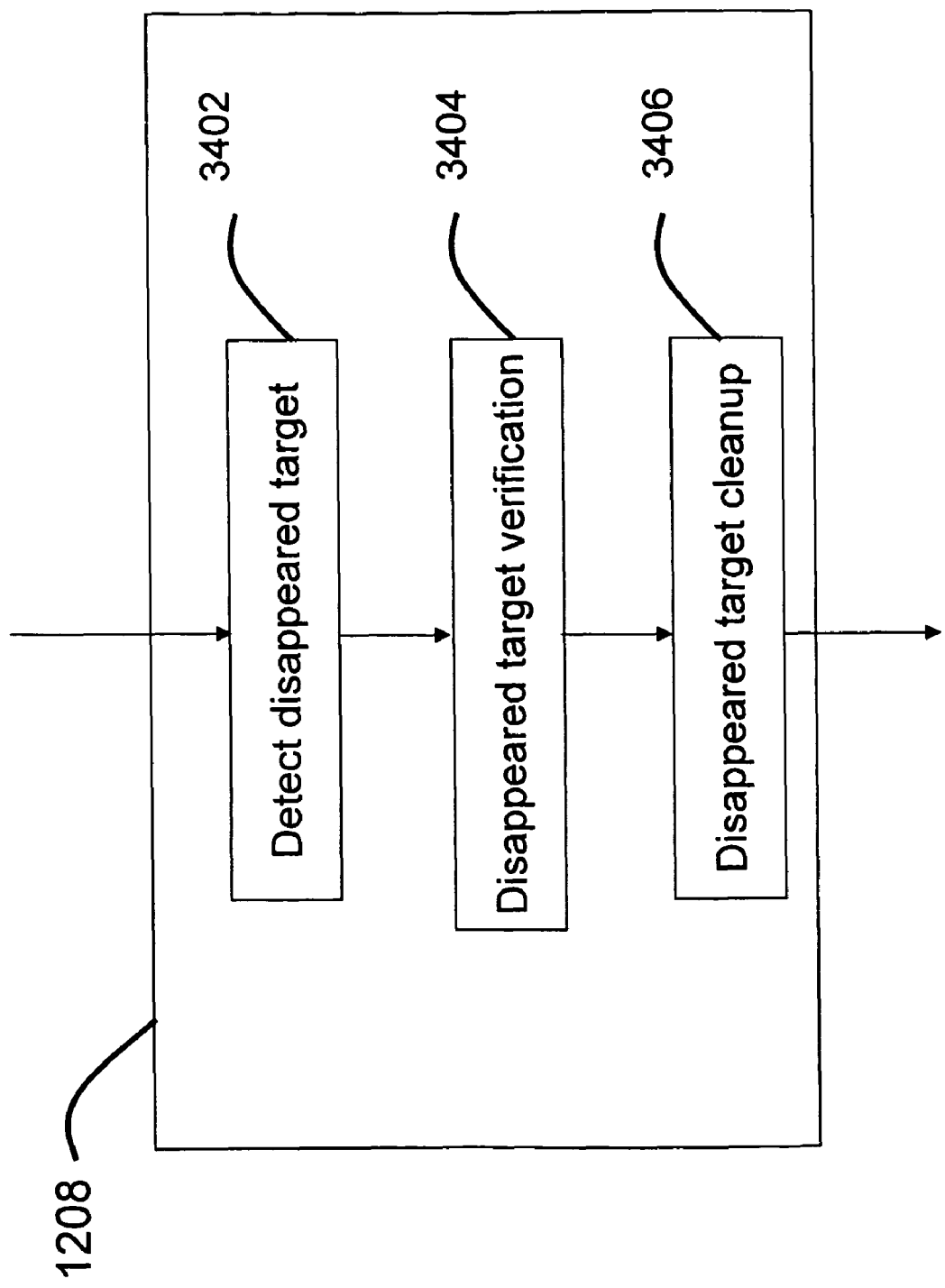
FIG. 34 depicts a conceptual block diagram of a disappeared target manager (DTM) module according to embodiments of the invention.

If, in block 3202, the "stationary" target was not detected to be moving, it may still need to be determined if the background scene of the stationary target has changed since the time the target stopped. In this case, even if the "stationary" target has moved away, we may not be able to observe the original background. Blocks 3206 and 3208 may be used to solve the problem. First, the process may proceed with block 3206 to check if the overlapping "visible" target is a "ghost" target. If it was a "ghost" target and it has a "sibling" target having very similar appearance to the "stationary" target, which may be checked by block 3208, the "sibling" target may actually be considered to be the moved-away "stationary" target, which may correspond to case 1. Otherwise, there may be no update to the "stationary" target, which refers to case 3 in FIG. 32. Here, a "sibling" target is a target created by splitting from a common target. In other words, the target and its "sibling" target are created at the same time and have the same "FromId" at their creation time FIG. 34 depicts a conceptual block diagram of the last major module, disappeared target manager (DTM) 1208, according to embodiments of the invention. First, block 3402 may perform "disappeared" target detection. There may be two scenarios: one is when there is no "visible" target in the scene, and the other is when there are targets that have just changed state from "visible" to "disappeared". When there is no "visible" target, block 3402 may look through the target list to change the states of all the "occluded" targets to "disappeared". This is because an "occluded" target is, by definition, partially viewable, and so it must be associated with at least one "visible" target. Therefore, when there is no "visible" target in the scene, the "occluded" targets must have disappeared. It follows, applying similar logic, that when a "visible" target just switched to the "disappeared" state, the disappeared target detection module 3402 may also change the status of all of its connected "occluded" targets to the "disappeared" state.

A "disappeared" target may appear in the scene and become "visible" again. This may be checked by disappeared target verification module 3404. The process of the module 3404 may be similar to occluded target verification module 1506. They may differ in two aspects. In occluded target verification, the candidate "visible" targets may be those just created from a target split/merge, while in disappeared target verification module 3404, the candidate "visible" targets may be newly appeared "visible" targets with "stable" tracking status. The newly "visible" targets may not be considered due to the fact that when they just begin appearing in the scene, usually only a part of the target is viewable, which makes appearance matching unreliable. The second difference is that when computing target matching probability, the occluded target verification module may jointly consider the target location match and the target connection relationships. However, in the occluded target verification case, a new "visible" target and a potential matching "disappeared" target are usually not connected at all. Thus, location match may receive more weight in a final decision. If a "disappeared" target was verified as being the same object as a newly "visible" target, the two targets would be connected by "EqualFrom" and "EqualTo" IDs, and the "disappeared" target state may be changed to the "reappeared" state.

The last part shown in the embodiment of DTM 1208 in FIG. 34 is disappeared target cleanup 3406. This may involve a process of switching the state of an obsolete "disappeared" target into the "expired" state. A "disappeared" target may be considered as "expired" when all of its connected targets are also disappeared, and it has been disappeared longer than a time duration threshold. The time duration threshold may be determined by the user based on the application requirements and available computing and storage resources.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method for target tracking, comprising:
tracking a state of each target in a video through multiple frames of said video, each state indicating a visibility condition of a target;
maintaining connection data for each target, said connection data indicating one or more relationships between said target and at least one other target, said connection data being based at least on a state of each target; and
tracking at least one target in said video based on said tracking a state of each target and on said maintaining connection data for each target;
wherein said tracking at least one target includes managing a visible target;
wherein said managing a visible target comprises:
predicting a location of at least one blob;
matching at least one existing target, if one exists, to said at least one blob, to thus generate at least one matched target;
updating said at least one matched target, if one exists; and
creating a new target corresponding to a remaining blob for which there is no corresponding matched target; and
wherein a computer performs said tracking a state of each target, said maintaining connection data for each target, and said tracking at least one target.

2. The method of claim 1, wherein said matching is based on at least one of the properties selected from the group consisting of: location overlap and appearance.

3. The method of claim 1, wherein said updating comprises: estimating a target tracking stability status.

4. The method of claim 1, further comprising: changing a state of a visible target for which there is no matching blob to a disappeared state.

5. The method of claim 1, wherein said tracking at least one target further includes managing an occluded target, and wherein said managing an occluded target comprises: updating a target connection; detecting an occluded target, if any; and verifying that a detected occluded target, if any, is an occluded target.

6. The method of claim 5, wherein said verifying comprises: finding potential equal targets; computing one or more matching measures between said potential equal targets; and making a verification decision based on a global matching criterion.

7. The method of claim 6, wherein said global matching criterion comprises a best satisfaction metric.

8. The method of claim 1, wherein said tracking at least one target further includes managing a stationary target, and wherein said managing a stationary target comprises: detecting a stationary target; and monitoring said stationary target.

9. The method of claim 8, wherein said detecting a stationary target comprises: detecting if a target is a stopped target; detecting if said stopped target is a passive target; and detecting if said stopped target is a ghost target.

10. The method of claim 9, wherein said detecting if a target is a stopped target comprises: comparing a current target slice to at least one previous target slice corresponding to said target to determine if there is any change; computing a stopped time between a previous target slice and said current target slice; and comparing said stopped time to a user-selected threshold to verify that said target is a stopped target.

11. The method of claim 9, wherein said detecting if said stopped target is a passive target comprises: checking a current mobility state of said stopped target; determining if said stopped target is a drop target; determining if said stopped target has a parent target; and performing a static passive test on said stopped target.

12. The method of claim 11, wherein said determining if said stopped target is a drop target comprises: measuring a velocity change of said stopped target prior to the stopped target having stopped.

13. The method of claim 9, wherein said detecting if said stopped target is a ghost target comprises: checking connection information of said stopped target to determine if said stopped target can be a ghost target; performing foreground/background texture analysis to detect a ghost target; classifying said ghost target; and processing said ghost target.

14. The method of claim 13, wherein said performing foreground/background texture analysis comprises: analyzing a boundary gradient intensity of said stopped target; and analyzing a foreground/background histogram similarity.

15. The method of claim 13, wherein said classifying said ghost target comprises: determining if said ghost target is an active ghost target or a passive ghost target.

16. The method of claim 15, wherein said processing said ghost target comprises: aligning said ghost target with its corresponding real target if it is determined to be an active ghost target.

17. The method of claim 15, wherein said determining if said ghost target is an active ghost target or a passive ghost target comprises: testing whether said ghost target has a single parent target and a single sibling target; testing whether said parent target spatially overlaps with said ghost target at a point in time when said parent target is first stable and whether said parent target was visible when said ghost target was first created, if said ghost target has a single parent target; and testing to determine if said ghost target has a size approximately the same as said sibling target and if said ghost target and said sibling target have approximately matching foreground histograms, if said parent target spatially overlaps with said ghost target at a point in time when said parent target is first stable and if said parent target was visible when said ghost target was first created.

18. The method of claim 9, further comprising: detecting if a target is an active target if it is not a stopped target.

19. The method of claim 18, wherein said detecting if a target is an active target comprises: determining, based on size, if said target has a potential parent target; measuring a duration of motion of said target if said target has a potential parent target; and comparing said duration of motion to a user-controllable threshold.

20. The method of claim 18, wherein said detecting if a target is an active target further comprises: determining if said target is a particular type of active target if said duration of motion is not sufficient in comparison with said threshold to determine that said target is active.

21. The method of claim 8, wherein said monitoring said stationary target comprises: determining if there is any visible target that spatially overlaps said stationary target; checking connection data to determine if there is any connection between a visible target that spatially overlaps said stationary target and said stationary target, if there is a visible target that spatially overlaps said stationary target; and determining if said stationary target begins to move.

22. The method of claim 21, wherein said monitoring said stationary target further comprises: verifying that said stationary target is a stationary target if there is no visible target that spatially overlaps said stationary target; and determining if said stationary target has disappeared.

23. The method of claim 22, wherein said verifying that said stationary target is a stationary target comprises: computing a foreground same ratio; and computing a background reappear ratio.

24. The method of claim 21, wherein said checking connection data comprises: determining if said stationary target has begun to move; and determining if said visible target is the same as said stationary target if said stationary target has begun to move.

25. The method of claim 24, wherein said checking connection data further comprises: determining if said visible target is a ghost target if said stationary target has not begun to move; and determining if said visible target has a sibling target that matches said stationary target if said visible target is a ghost target.

26. The method of claim 24, wherein said determining if said stationary target has begun to move comprises: defining a target boundary region; and comparing said stationary target to said target boundary region.

27. The method of claim 8, wherein said monitoring said stationary target comprises: tracking both foreground and background images of said stationary target; and monitoring both foreground and background images of said stationary target.

28. The method of claim 1, wherein said tracking at least one target further includes managing a disappeared target, and wherein said managing a disappeared target comprises: detecting a disappeared target, if any; verifying a previous disappeared target, if any, to check if it is still disappeared; and performing disappeared target cleanup.

29. The method of claim 28, wherein said detecting a disappeared target comprises: if there are no visible targets, changing a state of any previously occluded target to a disappeared state; and if a visible target has become a disappeared target, changing occluded targets connected to said visible target to disappeared targets.

30. The method of claim 28, wherein said verifying a previous disappeared target comprises: checking if said disappeared target has become visible.

31. The method of claim 1, further comprising: maintaining one or more target slices for each target, each target slice corresponding to a frame of said video, wherein said tracking a state of each target in a video is performed based on said one or more target slices.

32. A method of analyzing video comprising: detecting at least one property of said video, said at least one property selected from the group consisting of change and motion; extracting foreground blobs from said video, based on results of said detecting; tracking at least one target based on said foreground blobs, said tracking comprising the method according to claim 1.

33. A method of video surveillance comprising the method according to claim 32, and further comprising: detecting a predetermined event in said video based on said tracking of at least one target.

34. A non-transitory computer-readable medium containing executable code that when executed on a computer causes the computer to perform the method of claim 1.

35. A video processing system comprising: a video source providing video; a computer coupled to said video source to receive said video; and the non-transitory computer-readable medium according to claim 34, wherein said computer-readable medium is coupled to said computer to permit said computer to execute said computer-executable code.

36. Application-specific hardware adapted to implement the method according to claim 1.

37. A video analysis system comprising:
a video source providing video;
a computer coupled to said video source to receive said video;
a non-transitory computer-readable medium coupled to said computer;
a motion/change detection module;
a foreground blob extraction module coupled to receive output of said motion/change detection module; and
a target tracking module coupled to receive output of said foreground blob extraction module and to perform target tracking based on visibility state information of a target;
wherein said target tracking includes managing a stationary target;
wherein said managing a stationary target comprises: detecting a stationary target; and monitoring said stationary target;
wherein said monitoring said stationary target comprises: determining if there is any visible target that spatially overlaps said stationary target;
checking connection data to determine if there is any connection between a visible target that spatially overlaps said stationary target and said stationary target, if there is a visible target that spatially overlaps said stationary target; and
determining if said stationary target begins to move; and
wherein said motion/change detection module, said foreground blob extraction module, and said target tracking module are stored on the non-transitory computer readable medium.

38. The video analysis system of claim 37, wherein said target tracking module is further adapted to perform target tracking based on target connection data.

39. The video analysis system of claim 37, further comprising: an event detection module coupled to said target tracking module and adapted to detect at least one predetermined event based on an output of said target tracking module.

40. A method for target tracking, comprising:
tracking a state of each target in a video through multiple frames of said video, each state indicating a visibility condition of a target;
maintaining connection data for each target, said connection data indicating one or more relationships between said target and at least one other target, said connection data being based at least on a state of each target; and
tracking at least one target in said video based on said tracking a state of each target and on said maintaining connection data for each target;
wherein said tracking at least one target includes said managing a disappeared target; and
wherein managing a disappeared target comprises: detecting a disappeared target, if any; verifying a previous disappeared target, if any, to check if it is still disappeared; and performing disappeared target cleanup.

41. The method of claim 40, wherein said detecting a disappeared target comprises: if there are no visible targets, changing a state of any previously occluded target to a disappeared state; and if a visible target has become a disappeared target, changing occluded targets connected to said visible target to disappeared targets.

42. The method of claim 40, wherein said verifying a previous disappeared target comprises: checking if said disappeared target has become visible.

* * * * *